United States Patent
Chandramouli et al.

(10) Patent No.: US 9,514,214 B2
(45) Date of Patent: Dec. 6, 2016

(54) DETERMINISTIC PROGRESSIVE BIG DATA ANALYTICS

(71) Applicant: Microsoft Technology Licensing, LLC, Redmond, WA (US)

(72) Inventors: Badrish Chandramouli, Redmond, WA (US); Jonathan Goldstein, Redmond, WA (US); Abdul Hussain Quamar, Hyattsville, MD (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 95 days.

(21) Appl. No.: 13/915,632

(22) Filed: Jun. 12, 2013

(65) Prior Publication Data

US 2014/0372438 A1   Dec. 18, 2014

(51) Int. Cl.
*G06F 17/30* (2006.01)
(52) U.S. Cl.
CPC ... *G06F 17/30598* (2013.01); *G06F 17/30516* (2013.01); *G06F 17/30525* (2013.01); *G06F 17/30563* (2013.01); *G06F 17/30575* (2013.01); *G06F 17/30587* (2013.01)
(58) Field of Classification Search
CPC ................................. G06F 17/30348
See application file for complete search history.

(56) References Cited

U.S. PATENT DOCUMENTS

| | | | |
|---|---|---|---|
| 6,503,195 B1 | 1/2003 | Keller et al. | |
| 7,182,465 B2 | 2/2007 | Fuchs et al. | |
| 7,385,708 B2 | 6/2008 | Ackerman et al. | |
| 7,536,396 B2 | 5/2009 | Johnson et al. | |
| 7,650,331 B1 | 1/2010 | Dean et al. | |
| 7,716,215 B2 | 5/2010 | Lohman et al. | |
| 7,728,868 B2 | 6/2010 | Razzaque et al. | |
| 7,877,381 B2 | 1/2011 | Ewen et al. | |
| 7,882,138 B1 | 2/2011 | Kumar | |
| 7,890,444 B2 | 2/2011 | Torres et al. | |
| 8,032,554 B2 | 10/2011 | Nishizawa et al. | |
| 8,090,730 B2 | 1/2012 | Shahabi et al. | |
| 8,572,068 B2 | 10/2013 | Graefe et al. | |

(Continued)

FOREIGN PATENT DOCUMENTS

| | | |
|---|---|---|
| WO | 2014011708 A1 | 1/2014 |
| WO | 2014200877 A1 | 12/2014 |

OTHER PUBLICATIONS

Luo, et al., "Query Merging for Data Processing in the Cloud", Retrieved Feb. 20, 2013 at <<http://www.cs.duke.edu/~fanyang/file/296_final_report.pdf>>, final report on project at Duke University, retrieved online Feb. 20, 2013, 5 Pages.

(Continued)

*Primary Examiner* — Khanh Pham
(74) *Attorney, Agent, or Firm* — Alin Corie; Sandy Swain; Micky Minhas

(57) ABSTRACT

A plurality of data items that are annotated with progress markers may be obtained. The progress markers may indicate progress points associated with atemporal processing progress of the respective data items. Deterministic, massively parallel, progressive processing may be initiated on the plurality of data items on a plurality of devices, the progress markers indicating which of the plurality of data items are to be incorporated into results of the progressive processing, the progress markers further indicating an ordering for incorporation of the respective data items into the results.

20 Claims, 11 Drawing Sheets

(56) References Cited

U.S. PATENT DOCUMENTS

| | | | |
|---|---|---|---|
| 8,959,651 | B2* | 2/2015 | Li et al. .......................... 726/26 |
| 8,983,936 | B2 | 3/2015 | Fisher et al. |
| 2006/0031209 | A1 | 2/2006 | Ahlberg et al. |
| 2006/0106793 | A1 | 5/2006 | Liang |
| 2007/0016612 | A1 | 1/2007 | James et al. |
| 2007/0226178 | A1 | 9/2007 | Ewen et al. |
| 2008/0072180 | A1 | 3/2008 | Chevalier et al. |
| 2008/0077530 | A1 | 3/2008 | Banas et al. |
| 2008/0250357 | A1 | 10/2008 | Lee et al. |
| 2008/0306919 | A1 | 12/2008 | Iwayama et al. |
| 2009/0228434 | A1 | 9/2009 | Krishnamurthy et al. |
| 2009/0252404 | A1 | 10/2009 | Lecerf |
| 2009/0271529 | A1 | 10/2009 | Kashiyama et al. |
| 2009/0322754 | A1 | 12/2009 | Robertson et al. |
| 2009/0322756 | A1 | 12/2009 | Robertson et al. |
| 2010/0225661 | A1 | 9/2010 | Gorisch et al. |
| 2010/0241646 | A1* | 9/2010 | Friedman et al. ............ 707/764 |
| 2010/0268067 | A1 | 10/2010 | Razzaque et al. |
| 2011/0047120 | A1 | 2/2011 | Kamvar et al. |
| 2011/0084967 | A1 | 4/2011 | De Pauw et al. |
| 2011/0167110 | A1 | 7/2011 | Hoffberg et al. |
| 2011/0258183 | A1 | 10/2011 | Gibbs et al. |
| 2011/0302164 | A1 | 12/2011 | Krishnamurthy et al. |
| 2011/0310112 | A1 | 12/2011 | Zolotovitski |
| 2011/0314021 | A1 | 12/2011 | Gibbs et al. |
| 2012/0047125 | A1 | 2/2012 | Day et al. |
| 2012/0054173 | A1 | 3/2012 | Andrade et al. |
| 2012/0078939 | A1 | 3/2012 | Chen et al. |
| 2012/0089642 | A1 | 4/2012 | Milward et al. |
| 2012/0158708 | A1 | 6/2012 | Gillet et al. |
| 2012/0311581 | A1* | 12/2012 | Balmin et al. ................ 718/100 |
| 2013/0030860 | A1 | 1/2013 | Chaubey et al. |
| 2013/0046756 | A1 | 2/2013 | Hao et al. |
| 2013/0117257 | A1 | 5/2013 | Meijer et al. |
| 2013/0124097 | A1 | 5/2013 | Thorne |
| 2013/0179466 | A1* | 7/2013 | Mizobuchi et al. .......... 707/770 |
| 2013/0194271 | A1 | 8/2013 | Roesch et al. |
| 2013/0265319 | A1 | 10/2013 | Fisher et al. |
| 2014/0082178 | A1* | 3/2014 | Boldyrev et al. ............. 709/224 |
| 2014/0095525 | A1 | 4/2014 | Hsiao et al. |
| 2015/0269228 | A1 | 9/2015 | Fisher et al. |

OTHER PUBLICATIONS

Bain, Dr. William., "Using In-Memory Computing to Simplify Big Data Analytics", Retrieved Feb. 20, 2013 at <<http://www.datanami.com/datanami/2012-10-02/using_in-memory_computing_to_simplify_big_data_analytics.html>>, Datanami, Oct. 2, 2012, 5 Pages.

Gilbert, George., "Real-time Query for Hadoop Democratizes Access to Big Data Analytics", Retrieved Feb. 20, 2013 at <<http://www.cloudera.com/content/dam/cloudera/Resources/PDF/GigaOM_Cloudera_Real-time_query_for_Hadoop_democratizes_access_to_big_data_analytics.pdf>>, Giga Omni Media, Inc., Oct. 22, 2012, 18 Pages.

Gift, Noah., "Solve Cloud-Related Big Data Problems with MapReduce", Retrieved Feb. 20, 2013 at <<http://www.ibm.com/developerworks/cloud/library/cl-bigdata/?cmp=dw&cpb=dwcld&ct=dwnew&cr=dwnen&ccy=zz&csr=111810>>, IBM DeveloperWorks, Nov. 8, 2010, 6 Pages.

Harris, Derrick., "Cloudera makes SQL a first-class citizen in Hadoop", Retrieved Feb. 20, 2013 at <<http://gigaom.com/2012/10/24/cloudera-makes-sql-a-first-class-citizen-in-hadoop/>>, GIGAOM, Oct. 24, 2012, 5 Pages.

"Process Progress Dialog Box (Analysis Services—Multidimensional Data)", Retrieved Feb. 20, 2013 at <<http://technet.microsoft.com/en-us/library/ms190131(v=sql.105).aspx>>, Microsoft, 2 Pages.

Sato, Kazunori., "An Inside Look at Google BigQuery", Retrieved Feb. 20, 2013 at <<https://cloud.google.com/files/BigQueryTechnicalWP.pdf>>,Google, Inc., Retrieved online Feb. 20, 2013, 12 Pages.

Diao, Yanlei., "Scalable, Low-Latency Data Analytics and its Applications", Retrieved Feb. 20, 2013 at <<http://www.comp.hkbu.edu.hk/v1/file/seminar/20120117_Diao-2012public.pdf>>, University of Massachusetts Amherst, Retrieved online Feb. 20, 2013, 29 Pages.

Abadi, et al., "The Design of the Borealis Stream Processing Engine", Retrieved Feb. 20, 2013 at <<http://www.cs.harvard.edu/~mdw/course/cs260r/papers/borealis-cidr05.pdf>>, In Proceedings of the Second Biennial Conference on Innovative Data Systems Research (CIDR), Jan. 2005, 13 Pages.

Ali, et al., "Microsoft CEP Server and Online Behavioral Targeting", Retrieved Feb. 20, 2013 at <<http://research.microsoft.com/pubs/101568/MicrosoftCEPDemo.pdf>>, In Journal of Proceedings of the Very Large Database Endowment (VLDB '09), vol. 2, Issue 2, Aug. 24, 2009, 4 Pages.

Babcock, et al., "Models and Issues in Data Stream Systems", Retrieved Feb. 20, 2013 at <<http://infolab.usc.edu/csci599/Fall2002/paper/DML2_streams-issues.pdf>>, In Proceedings of the Twenty-First ACM SIGMOD-SIGACT-SIGART Symposium on Principles of Database Systems (PODS '02), Jun. 3, 2002, 30 Pages.

Barga, at al., "Iterative MapReduce Research on Azure", Retrieved Feb. 25, 2013 at <<http://research.microsoft.com/en-us/people/barga/sc11daytona.pdf>>, International Conference for High Performance Computing, Networking, Storage and Analysis (SC 11), Nov. 12, 2011, 1 Page.

Barga, at al., "Consistent Streaming Through Time: A Vision for Event Stream Processing", Retrieved Feb. 20, 2013 at <<http://arxiv.org/ftp/cs/papers/0612/0612115.pdf>>, In 3rd Biennial Conference on Innovative Data Systems Research (CIDR), Jan. 7, 2007, 12 Pages.

Chandramouli, et al., "Temporal Analytics on Big Data for Web Advertising", Retrieved Feb. 21, 2013 at <<http://ieeexplore.ieee.org/stamp/stamp.jsp?tp=&arnumber=6228075>>, In IEEE 28th International Conference on Data Engineering, Apr. 1, 2012, pp. 90-101.

Chaudhuri, et al., "Effective Use of Block-Level Sampling in Statistics Estimation", Retrieved Feb. 22, 2013 at <<http://infolab.stanford.edu/~usriv/papers/bls.pdf>>, In Proceedings of the ACM SIGMOD International Conference on Management of Data, Jun. 13, 2004, 12 Pages.

Condie, et al., "MapReduce Online", Retrieved Feb. 22, 2013 at <<http://db.cs.berkeley.edu/papers/nsdi10-hop.pdf>>, In Proceedings of the 7th USENIX Conference on Networked Systems Design and Implementation (NSDI'10), Apr. 28, 2010, 15 Pages.

"Daytona: Iterative MapReduce on Windows Azure", Retrieved Sep. 19, 2013 at <<http://research.microsoft.com/en-us/projects/daytona/>>, Microsoft Research, retrieved online Sep. 19, 2013, 4 pages.

Dean, et al., "MapReduce: Simplified Data Processing on Large Clusters", Retrieved Feb. 22, 2013 at <<http://static.usenix.org/event/osdi04/tech/full_papers/dean/dean.pdf>>, In Proceedings of 6th Symposium on Operating Systems Design and Implementation (OSDI '04), Dec. 6, 2004, pp. 137-149.

Doucet, et al., "Efficient Block Sampling Strategies for Sequential Monte Carlo Methods", Retrieved Feb. 22, 2013 at <<http://www.cs.ubc.ca/~arnaud/almostfinalversionjcgs.pdf>>, In Journal of Computational and Graphical Statistics, vol. 15, Issue 3, Sep. 2006, 19 Pages.

Grover, et al., "Extending Map-Reduce for Efficient Predicate-Based Sampling", Retrieved Feb. 22, 2013 at <<http://ieeexplore.ieee.org/stamp/stamp.jsp?tp=&arnumber=6228108>>, In IEEE 28th International Conference on Data Engineering, Apr. 1, 2012, pp. 486-497.

Haas, et al., "Ripple Joins for Online Aggregation", Retrieved Feb. 22, 2013 at <<http://static.cs.brown.edu/courses/cs227/archives/2008/Papers/QueryEval/HaasHellerstein.pdf>>, In Proceedings of the ACM SIGMOD International Conference on Management of Data (SIGMOD '99), Jun. 1, 1999, pp. 287-298.

Haas, et al., "Join Algorithms for Online Aggregation", Retrieved Feb. 22, 2013 at <<http://citeseerx.ist.psu.edu/viewdoc/

(56) References Cited

OTHER PUBLICATIONS download;jsessionid=881BEE78081A02A8EA962993C3F54-E2B?doi=10.1.1.55.9766&rep=rep1&type=pdf>>, IBM Research Report RJ 10126 (95001), IBM Almaden Research, Jun. 30, 1998, 42 Pages.

Hall, et al., "Processing a Trillion Cells Per Mouse Click", Retrieved Feb. 22, 2013 at <<http://vldb.org/pvldb/vol5/p1436_alexanderhall_vldb2012.pdf>>, In Proceedings of the VLDB Endowment, vol. 5, No. 11, Aug. 27, 2012, pp. 1436-1446.

Hammad, et al., "Nile: A Query Processing Engine for Data Streams", Retrieved Feb. 22, 2013 at <<http://ieeexplore.ieee.org/stamp/stamp.jsp?tp=&arnumber=1320080>>, In Proceedings of the 20th International Conference on Data Engineering (ICDE'04), Mar. 30, 2004, 1 Page.

Hellerstein, et al., "Informix Under Control: Online Query Processing", Retrieved Feb. 22, 2013 at <<http://www.cs.du.edu/~leut/4423/papers/controlInformix.pdf>>, In Journal of Data Mining and Knowledge Discovery, vol. 4, Issue 4, Oct. 2000, pp. 281-314.

Hellerstein, et al., "Online Aggregation", Retrieved Feb. 22, 2013 at <<https://www.cs.duke.edu/courses/spring03/cps216/papers/hellerstein-etal-1997.pdf>>, In Proceedings of the ACM SIGMOD International Conference on Management of Data, May 13, 1997, 12 Pages.

Jensen, et al., "Temporal Specialization", Retrieved Feb. 22, 2013 at <<http://ieeexplore.ieee.org/stamp/stamp.jsp?tp=&arnumber=213149>>, In Proceedings of the Eighth International Conference on Data Engineering, Feb. 2, 1992, pp. 594-603.

Jermaine, et al., "Scalable Approximate Query Processing with the DBO Engine", Retrieved Feb. 22, 2013 at <<http://citeseerx.ist.psu.edu/viewdoc/download?doi=10.1.1.79.9444&rep=rep1&type=pdf>>, In Proceedings of the ACM SIGMOD International Conference on Management of Data (SIGMOD '07), Jun. 12, 2007, pp. 725-736.

Laptev, et al., "Early Accurate Results for Advanced Analytics on MapReduce", Retrieved Feb. 22, 2013 at <<http://arxiv.org/pdf/1207.0142v1.pdf>>, In Proceedings of the VLDB Endowment, vol. 5, No. 10, Aug. 27, 2012, pp. 1028-1039.

Li, et al., "A Platform for Scalable One-Pass Analytics Using MapReduce", Retrieved Feb. 22, 2013 at <<http://people.cs.umass.edu/~mcgregor/papers/11-sigmod.pdf>>, In Proceedings of the ACM SIGMOD International Conference on Management of Data (SIGMOD '11), Jun. 12, 2011, 12 Pages.

Melnik, et al., "Dremel: Interactive Analysis of Web-Scale Datasets", Retrieved Feb. 22, 2013 at <<http://static.googleusercontent.com/external_content/untrusted_dlcp/research.google.com/en//pubs/archive/36632.pdf>>, 36th International Conference on Very Large Data Bases, Proceedings of the VLDB Endowment, vol. 3, No. 1, Sep. 13, 2010, 10 Pages.

Pansare, et al., "Online Aggregation for Large MapReduce Jobs", International Conference on Very large Data Bases (VLDB '11), vol. 4, Issue 11, Aug. 29, 2011, 11 Pages.

Raman, et al., "Online Dynamic Reordering for Interactive Data Processing", Retrieved Feb. 22, 2013 at <<http://www.eecs.berkeley.edu/Pubs/TechRpts/1999/CSD-99-1043.pdf>>, In Proceedings of the 25th International Conference on Very Large Data Bases (VLDB '99 ), Sep. 7, 1999, 19 Pages.

Rowstron, et al., "Nobody Ever Got Fired for Using Hadoop on a Cluster", Retrieved Feb. 22, 2013 at <<http://research.microsoft.com/en-us/um/people/antr/Publications/hotcbp12%20final.pdf>>, In Proceedings of the 1st International Workshop on Hot Topics in Cloud Data Processing (HotCDP 2012), Article No. 2, Apr. 10, 2012, 5 Pages.

Ryvkina, et al., "Revision Processing in a Stream Processing Engine: A High-Level Design", Retrieved Feb. 22, 2013 at <<http://ieeexplore.ieee.org/stamp/stamp.jsp?tp=&arnumber=1617509>>, In Proceedings of the 22nd International Conference on Data Engineering (ICDE'06), Apr. 3, 2006, 3 Pages.

"LINQ (Language-Integrated Query)", Retrieved Feb. 22, 2013 at <<http://msdn.microsoft.com/en-us/library/vstudio/bb397926.aspx>>, Microsoft, retrieved online Feb. 22, 2013, 1 Page.

Upadhyaya, et al., "A Latency and Fault-Tolerance Optimizer for Online Parallel Query Plans", Retrieved Feb. 22, 2013 at <<http://homes.cs.washington.edu/~magda/papers/upadhyaya-sigmod11.pdf>>, In Proceedings of the ACM SIGMOD International Conference on Management of Data (SIGMOD'11), Jun. 12, 2011, 12 Pages.

White, Tom., "Hadoop: The Definitive Guide", Retrieved Feb. 25, 2013 at <<http://faculty.qu.edu.qa/malmeer/506499/OReilly.Hadoop.The.Definitive.Guide.Jun.2009.pdf>>, In O'Reilly, Yahoo! Press, 2009, 525 Pages.

Zaharia, et al., "Resilient Distributed Datasets: A Fault-Tolerant Abstraction for In-Memory Cluster Computing", In Proceedings of the 9th USENIX Conference on Networked Systems Design and Implementation (NSDI'12), Apr. 25, 2012, 14 Pages.

Fisher, et al., "Progressive Query Computation Using Streaming Architectures", U.S. Appl. No. 13/723,224, filed Dec. 21, 2012, 53 pages.

Chandramouli, et al., "Scalable Progressive Analytics on Big Data in the Cloud," Retrieved Sep. 20, 2013 at <<http://research.microsoft.com/pubs/200169/now-vldb.pdf>>, Proceedings of the VLDB Endowment, vol. 6, No. 14, 39th International Conference on Very Large Data Bases, Aug. 26, 2013, 12 pages.

Piringer et al.; "A Multi-Threading Architecture to Support Interactive Visual Exploration"; In IEEE Transactions on Visualization and Computer Graphics (2009), vol. 15, Issue: 6, Publisher: IEEE, pp. 1113-1120 Nov.-Dec.; published via Internet on Oct. 11, 2009.

Cottam et al.; "Bit by Bit: Incremental Data Visualization", Published Oct. 19, 2008 via Internet; IEEE Symposium on Information Visualization, 2009; Retrieved from "http://www.cs.indiana.edu/.about.jcottam/pubs/InfoVis09-BitByBit.pdf" on Apr. 1, 2012.

Garrett et al.; "Real-Time Incremental Visualization of Dynamic Ultrasound Volumes Using Parallel BSP Trees"; Department of Computer Science, University of North Carolina at Chapel Hill; Published in IEEE Visualization '96 Proceedings held Oct. 27-Nov. 1, 1996, pp. 235-240; downloaded from "http://www.cs.unc.edu/.about.whitton/ExtendedCV/Papers/1996-Viz-Garrett.-pdf" on Apr. 1, 2012.

Deligiannidis et al.;"User-Centered Incremental Data Exploration and Visualization"; LSDIS Lab and Computer Science, The University of Georgia; Published Year: 2008; Downloaded from "http://lsdis.cs.uga.edu/projects/semvis/PGV/PGV.pdf" on Apr. 1, 2012.

Office Action mailed May 14, 2013 for Fisher et al., U.S. Appl. No. 13/439,563, entitled "Incremental Visualization for Structured Data in an Enterprise-level Data Store," filed Apr. 4, 2012, 7 pages.

Response filed Sep. 12, 2013 in response to Office Action mailed May 14, 2013 for Fisher et al., U.S. Appl. No. 13/439,563, entitled "Incremental Visualization for Structured Data in an Enterprise-level Data Store," filed Apr. 4, 2012, 9 pages.

Office Action mailed Nov. 1, 2013 for Fisher et al., U.S. Appl. No. 13/439,563, entitled "Incremental Visualization for Structured Data in an Enterprise-level Data Store," filed Apr. 4, 2012, 8 pages.

Response filed Feb. 3, 2014 in response to Office Action mailed Nov. 1, 2013 for Fisher et al., U.S. Appl. No. 13/439,563, entitled "Incremental Visualization for Structured Data in an Enterprise-level Data Store," filed Apr. 4, 2012, 10 pages.

Office Action mailed May 9, 2014 for Fisher et al., U.S. Appl. No. 13/439,563, entitled "Incremental Visualization for Structured Data in an Enterprise-level Data Store," filed Apr. 4, 2012, 10 pages.

Response filed Aug. 11, 2014 in response to Office Action mailed May 9, 2014 for Fisher et al., U.S. Appl. No. 13/439,563, entitled "Incremental Visualization for Structured Data in an Enterprise-level Data Store," filed Apr. 4, 2012, 9 pages.

Notice of Allowance mailed Oct. 28, 2014 for Fisher et al., U.S. Appl. No. 13/439,563, entitled "Incremental Visualization for Structured Data in an Enterprise-level Data Store," filed Apr. 4, 2012, 9 pages.

Fisher et al., "Exploratory Visualization Involving Incremental, Approximate Database Queries and Uncertainty," IEEE Computer Graphics and Applications, vol. 32, Issue 4, Jul. 2012, pp. 55-62.

"International Search Report and Written Opinion Issued in PCT Application No. PCT/US2014/041450", Mailed Date: Nov. 25, 2014, 14 Pages.

(56) References Cited

OTHER PUBLICATIONS

Michael, et al., "Simple, Fast, and Practical Non-Blocking and Blocking Concurrent Queue Algorithms", In Proceedings of the Fifteenth Annual ACM Symposium on Principles of Distributed Computing, May 23, 1996, 9 Pages.
Bose, et al., "Beyond Online Aggregation: Parallel and Incremental Data Mining with Online Map-Reduce", In Proceedings of the Workshop on Massive Data Analytics on the Cloud, Apr. 26, 2010, 6 Pages.
"International Preliminary Report on Patentability," from PCT Patent Application No. PCT/US2013/049820, Mailed Feb. 19, 2015, 17 pages.
"International Search Report," from PCT Patent Application No. PCT/US2013/049820, Mailed May 26, 2014, 5 pages.
Correa, et al., "A Framework for Uncertainty-Aware Visual Analytics", Retrieved Jan. 11, 2012 at <<http://www.cs.ucdavis.edu/research/tech-reports/2009/CSE-2009-6.pdf>>, Proceedings of IEEE Symposium on Visual Analytics Science and Technology (VAST 2009), pp. 51-58.
"Uncertainty Visualization", Retrieved Jan. 11, 2012 at <<http://spatial-analyst.net/wiki/index.php?title=Uncertainty_visualization>>, 11 pages.
Fisher et al., "Trust Me, I'm Partially Right: Incremental Visualization Lets Analysts Explore Large Datasets Faster," Available Apr. 4, 2012 at <<http://eprints.soton.ac.uk/273149/1/chi2012_interactive.pdf>>, In: CHI 2012, May 5-12, 2012, Austin, Texas, 10 pages.
Fisher, D., "Incremental, Approximate Database Queries and Uncertainty for Exploratory Visualization", Retrieved Apr. 4, 2012 at <<http://research.microsoft.com/pubs/153555/fisher.pdf>>, Proceedings of IEEE Symposium on Large-Scale Data Analysis and Visualization (LDAV) 2011, 8 pages.
Hellerstein, et al., "Interactive Data Analysis: The Control Project ", Retrieved Jan. 11, 2012 at <<http://ieeexplore.ieee.org/stamp/stamp.jsp?tp=&arnumber=781635>>, IEEE Computer, vol. 32, Issue 8 (1999), pp. 51-59.
Jermaine et al., "The Sort-Merge-Shrink Join", Apr. 4, 2012 at <<http://www.cise.ufl.edu/~apol/i/smstods.pdf >>, ACM Transactions on Database Systems 31(4) (2006), pp. 1382-1416.
Kim et al., "Selecting the Best System: Theory and Methods", Retrieved Apr. 4, 2012 at <<http://informs-sim.org/wsc03papers/013.pdf>>, In Proceedings of the 2003 Winter Simulation Conference, vol. 1 (2003), pp. 101-112.
Maurer, et al., "Empirical Bernstein Bounds and Sample Variance Penalization", Retrieved Apr. 4, 2012 at <<http://www.andreas-maurer.eu/svp-final.pdf>>, In Proceedings of the Twenty-Second Annual Conference on Learning Theory, 7 (2009), 9 pages.
Olston, et al., "Visualizing data with bounded uncertainty", Retrieved Jan. 11, 2012 at <<http://citeseerx.ist.psu.edu/viewdoc/download;jsessionid=63116511EA05D5D85C39987FEC5DCACE?doi=10.1.1.1.8227&rep=rep1&type=pdf >>, In Proceedings of IEEE Symposium on Information Visualization (2002), 8 pages.
Sanyal, et al., "A User Study to Compare Four Uncertainty Visualization Methods for 1D and 2D Datasets", Retrieved Jan. 11, 2012 at <<http://ieeexplore.ieee.org/stamp/stamp.jsp?tp=&arnumber=5290731>>, IEEE Transactions on Visualization and Computer Graphics 15(6) (2009), pp. 1209-1218.
Streit, et al., "A Spreadsheet Approach to Facilitate Visualization of Uncertainty in Information", Retrieved Jan. 11, 2012 at <<http://ieeexplore.ieee.org/stamp/stamp.jsp?tp=&arnumber=4359495>>, IEEE Transactions on Visualization and Computer Graphics 14(1) (2008), pp. 61-72.
Wickham, et al., "40 Years of Boxplots", Retrieved Apr. 4, 2012 at <<http://vita.had.co.nz/papers/boxplots.pdf>>, Nov. 29, 2011, 17 pages.
Jackson, C.H., "Displaying Uncertainty With Shading", The American Statistician, vol. 62, No. 4 (Nov. 2008), 8 pages.
Esty, et al., "The Box-Percentile Plot", Retrieved Feb. 14, 2012 at <<http://www.jstatsoft.org/v08/i17/paper>>, Journal of Statistical Software, 8(17), (2003), pp. 1-14.
Kampstra, P., "Beanplot: A Boxplot Alternative for Visual Comparison of Distributions", Retrieved Feb. 14, 2012 at <<http://www.jstatsoft.org/v28/c01/paper>>, Journal of Statistical Software, Code Snippets, 28(1), (2008), pp. 1-9.
Slezak, et al., "Towards Approximate SQL: Infobright's Approach", In Proceedings of the 7th International Conference on Rough Sets and Current Trends in Computing (RSCTC'10), (2010), pp. 630-639.
"Airline On-Time Performance and Causes of Flight Delays", Retrieved Apr. 4, 2012 at <<http://explore.data.gov/d/ar4r-an9z>>, 1 page.
"Second Written Opinion Issued in PCT Patent Application No. PCT/US2014/041450", Mailed Date: Apr. 22, 2015, 9 Pages.
Notification of Transmittal of International Preliminary Report on Patentability Issued in PCT Patent Application No. PCT/US2014/041450, Mailed Date: Aug. 12, 2015, 10 Pages.
International Preliminary Report on Patentability Issued in PCT Patent Application No. PCT/US2014/041450, Issued Date: Aug. 12, 2015, 17 Pages.
Office Action mailed Jul. 9, 2015 for Fisher et al., U.S. Appl. No. 13/723,224, entitled "Progressive Query Computation Using Streaming Architectures," filed Dec. 21, 2012, 9 pages.
Response filed Sep. 21, 2015 in response to Office Action mailed Jul. 9, 2015 for Fisher et al., U.S. Appl. No. 13/723,224, entitled "Progressive Query Computation Jsing Streaming Architectures," filed Dec. 21, 2012, 8 pages.
Office Action mailed Oct. 14, 2015 for Fisher et al., U.S. Appl. No. 13/723,224, entitled "Progressive Query Computation Using Streaming Architectures," 'lied Dec. 21, 2012, 10 pages.
Response filed Jan. 6, 2016 in response to Office Action mailed Oct. 14, 2015 for Fisher et al., U.S. Appl. No. 13/723,224, entitled "Progressive Query Computation Using Streaming Architectures," filed Dec. 21, 2012, 11 pages.
Office Action mailed Feb. 24, 2016 for Fisher et al., U.S. Appl. No. 13/723,224, entitled "Progressive Query Computation Using Streaming Architectures," 'filed Dec. 21, 2012, 17 pages.
Response filed Apr. 29, 2016 in response to Office Action mailed Feb. 24, 201 for Fisher et al., U.S. Appl. No. 13/723,224, entitled "Progressive Query Computation Jsing Streaming Architectures," filed Dec. 21, 2012, 9 pages.
Office Action mailed May 23, 2016 for Fisher et al., U.S. Appl. No. 13/723,224, entitled "Progressive Query Computation Using Streaming Architectures," filed Dec. 21, 2012, 11 pages.

\* cited by examiner

| PI | Ad | Ctr |
|---|---|---|
| [0,1) | $a_0$ | 0.5 |
| [1,2) | $a_0$ | 0.66 |
| [2,∞) | $a_0$ | 0.6 |

510

| PI | Ad | Clicks |
|---|---|---|
| [0,1) | $a_0$ | 1 |
| [1,2) | $a_0$ | 2 |
| [2,∞) | $a_0$ | 3 |

506

| PI | Ad | Imprs |
|---|---|---|
| [0,1) | $a_0$ | 2 |
| [1,2) | $a_0$ | 3 |
| [2,∞) | $a_0$ | 5 |

508

| PI | User | Ad |
|---|---|---|
| [0,∞) | $u_0$ | $a_0$ |
| [0,∞) | $u_0$ | $a_0$ |
| [1,∞) | $u_1$ | $a_0$ |
| [2,∞) | $u_2$ | $a_0$ |
| [2,∞) | $u_2$ | $a_0$ |

504

| PI | User | Ad |
|---|---|---|
| [0,∞) | $u_0$ | $a_0$ |
| [1,∞) | $u_1$ | $a_0$ |
| [2,∞) | $u_2$ | $a_0$ |

Table 800 (802)

| PI | User | Ad |
|---|---|---|
| $[0,\infty)$ | $u_0$ | $a_0$ |
| $[0,\infty)$ | $u_0$ | $a_0$ |
| $[1,\infty)$ | $u_1$ | $a_0$ |
| $[1,\infty)$ | $u_1$ | $a_1$ |
| $[2,\infty)$ | $u_2$ | $a_1$ |
| $[2,\infty)$ | $u_2$ | $a_1$ |
| $[2,\infty)$ | $u_2$ | $a_1$ |

Table 804

| PI | User | Ad |
|---|---|---|
| $[0,\infty)$ | $u_0$ | $a_0$ |
| $[0,\infty)$ | $u_0$ | $a_0$ |
| $[1,\infty)$ | $u_1$ | $a_0$ |
| $[1,\infty)$ | $u_1$ | $a_1$ |
| $[2,\infty)$ | $u_2$ | $a_1$ |
| $[2,\infty)$ | $u_2$ | $a_1$ |
| $[2,\infty)$ | $u_2$ | $a_1$ |

Table 806

| PI | User | Ad |
|---|---|---|
| $[0,\infty)$ | $u_0$ | $a_0$ |
| $[0,\infty)$ | $u_0$ | $a_0$ |
| $[0,\infty)$ | $u_1$ | $a_0$ |
| $[0,\infty)$ | $u_1$ | $a_1$ |
| $[1,\infty)$ | $u_2$ | $a_1$ |
| $[1,\infty)$ | $u_2$ | $a_1$ |
| $[1,\infty)$ | $u_2$ | $a_1$ |

FIG. 8

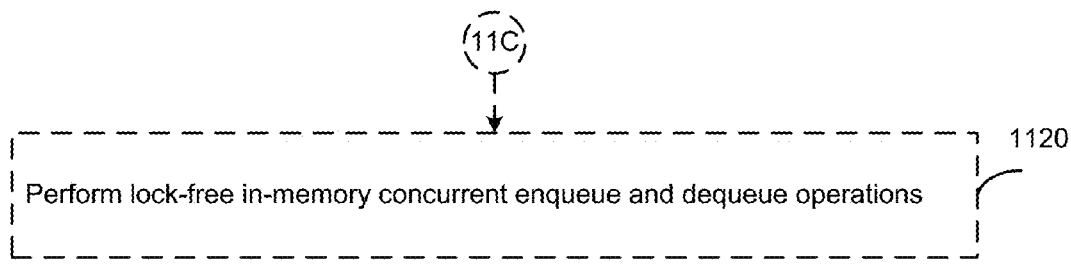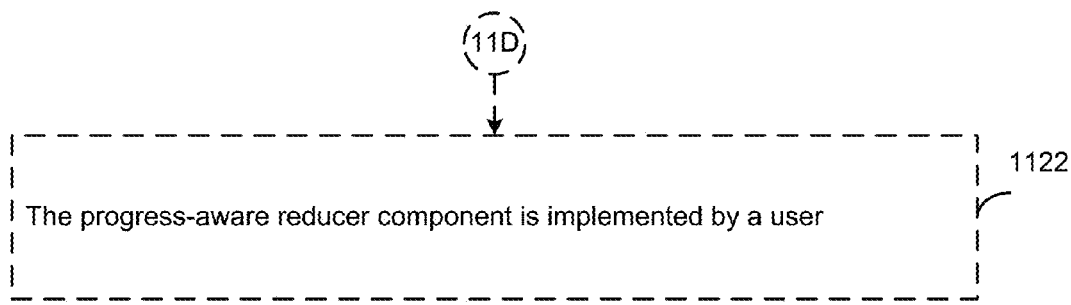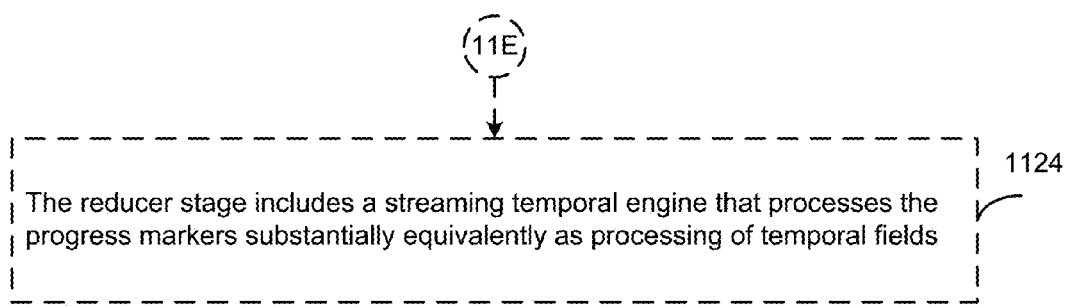
FIG. 11C

DETERMINISTIC PROGRESSIVE BIG DATA ANALYTICS

BACKGROUND

With increasing volumes of data stored and processed in clusters such as the Cloud, analytics over such data is becoming very expensive. For example, a pay-as-you-go paradigm associated with the Cloud may cause computation costs to increase linearly with query execution time, making it possible for a data scientist to easily spend large amounts of money analyzing data. The expense may be exacerbated by the exploratory nature of analytics, where queries are iteratively discovered and refined, including the submission of many off-target and erroneous queries (e.g., faulty parameters). In conventional systems, queries and other computations may need to execute to completion before such issues are diagnosed, often after hours of expensive computation time are exhausted.

SUMMARY

According to one general aspect, a system may include a distributed progressive analytics engine that includes a data item acquisition component configured to obtain a plurality of data items that are annotated with progress markers indicating progress points associated with atemporal processing progress of the respective data items. A progressive distributed processing manager may be configured to initiate deterministic, massively parallel, progressive processing of the plurality of data items on a plurality of devices, the progress markers indicating which of the plurality of data items are to be incorporated into results of the progressive processing, the progress markers further indicating an ordering for incorporation of the respective data items into the results.

According to another aspect, a plurality of data items that are annotated with progress markers may be obtained. The progress markers may indicate progress points associated with atemporal processing progress of the respective data items. Deterministic, massively parallel, progressive processing of the plurality of data items may be initiated on a plurality of devices, the progress markers indicating which of the plurality of data items are to be incorporated into results of the progressive processing, the progress markers further indicating an ordering for incorporation of the respective data items into the results.

According to another aspect, a computer-readable storage medium may store instructions that are configured to cause the one or more processors to obtain a plurality of data items that are annotated with progress markers indicating progress points associated with atemporal processing progress of the respective data items. Further, the instructions may be configured to cause the one or more processors initiate deterministic, massively parallel, progressive processing of the plurality of data items on a plurality of devices, the progress markers indicating which of the plurality of data items are to be incorporated into results of the progressive processing, the progress markers further indicating an ordering for incorporation of the respective data items into the results.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. The details of one or more implementations are set forth in the accompanying drawings and the description below. Other features will be apparent from the description and drawings, and from the claims.

BRIEF DESCRIPTION OF THE DRAWINGS

FIG. 5 illustrates example progressive results using augmented input data.

FIG. 8 illustrates example annotated input data and example, progress-batches.

FIGS. 11A-11C are a flowchart illustrating example operations of the system of FIG. 4.

DETAILED DESCRIPTION

I. Introduction

Figures 1, 2, 3:
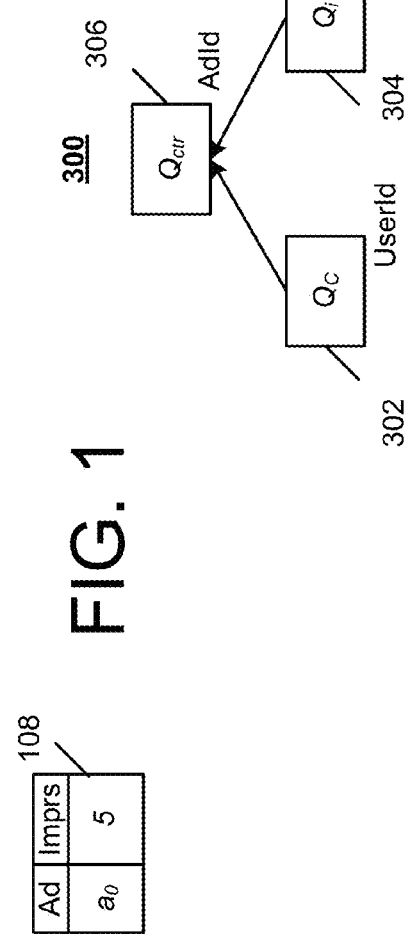
FIG. 1 illustrates an example input to an example system, sorted by user, and results for example queries.
FIG. 2 illustrates progressive results for the example of FIG. 1.
FIG. 3 illustrates example map-reduce that partition data.

Analytics over the increasing quantity of data stored in clusters such as the Cloud are becoming increasingly expensive. Data scientists may typically manually extract samples of increasing data size (e.g., progressive samples) using domain-specific sampling strategies for exploratory querying. This provides user-control, repeatable semantics, and result provenance. However, such solutions may result in tedious workflows that preclude the reuse of work across samples. However, conventional approximate query processing systems may report early results, but may not offer the above benefits for complex ad-hoc queries.

Example techniques discussed herein may provide a progressive analytics system based on a progress model (which may be referred to as "Prism" herein) that may (1) allow users to communicate progressive samples to the system; (2) allow efficient and deterministic query processing over samples; and (3) provide repeatable semantics and provenance, for example, to data scientists.

For example, a model for atemporal relational queries may be realized using an unmodified temporal streaming engine, by re-interpreting temporal event fields to denote progress. Based on such a progress model, an example progressive data-parallel computation framework may be determined (e.g., for WINDOWS AZURE), where progress is understood as a first-class citizen in the framework. For example, the progressive data-parallel computation framework may work with "progress-aware reducers," as discussed further herein. For example, it may work with streaming engines to support progressive Structured Query Language (SQL) over big data.

In accordance with the exploratory nature of analytics, queries may be iteratively discovered and refined, including the submission of many off-target and erroneous queries (e.g., faulty parameters). In conventional systems, queries and other computations may need to execute to completion before such issues are diagnosed, often after hours of expensive computation time are exhausted.

Data scientists therefore may choose to perform their ad-hoc querying on extracted samples of data. This approach provides them with the control to carefully choose from a variety of sampling strategies in a domain-specific manner (see, e.g., D. Cohn et al., "Improving generalization with active learning," *Machine Learning,* Vol. 15, Issue 2, May 1994, pp. 201-221; M. D. McKay et al., "Comparison of Three Methods for Selecting Values of Input Variables in the Analysis of Output from a Computer Code," *Technometrics,* Vol. 21, No. 2, 1979, pp. 55-61; O. Maron et al., "Hoeffding races: Accelerating model selection search for classification and function approximation," In *Advances in Neural Information Processing Systems,* Vol. 6, 1994, pp. 59-66).

For a given sample, this approach may provide precise (e.g., relational) query semantics, repeatable execution using a query processor and optimizer, result provenance in terms of what data contributed to an observed result, and query composability. Further, since choosing a fixed sample size a priori for all queries may be impractical, data scientists may create and operate over multiple progressive samples of increasing size, (see, e.g., M. D. McKay et al., supra).

In attempts to aid data scientists, the database community has proposed approximate query processing (AQP) systems such as CONTROL (see, e.g., J. M. Hellerstein et al., "Informix under control: Online query processing," Data Mining and Knowledge Discovery Journal, Vol. 4, Issue 4 (2000), pp. 281-314) and DBO (see, e.g., C. Jermaine et al., "Scalable approximate query processing with the DBO engine," *In Proceedings of the* 2007 *ACM SIGMOD International Conference on Management of Data* (SIGMOD '07), 2007, pp. 725-736) that perform progressive analytics.

In this context, "progressive analytics" may refer to the generation of early results to analytical queries based on partial data, and the progressive refinement of these results as more data is received. For example, progressive analytics may allow users to obtain early results using substantially fewer resources, and potentially end (and possibly refine) computations early once acceptable accuracy or query incorrectness is observed.

The general focus of conventional AQP systems has, however, been on automatically providing confidence intervals for results, and selecting processing orders to reduce bias. For example, a premise of AQP systems is that users are not involved in specifying the semantics of early results; rather, the system takes up the responsibility of defining and providing accurate early results. To be useful, the system may automatically select effective sampling strategies for a particular combination of query and data. This may work for narrow classes of workloads, but may not generalize to complex ad-hoc queries. A classic example is the infeasibility of sampling for join trees (see, e.g., S. Chaudhuri et al., "On random sampling over joins," In Proceedings of the 1999 ACM SIGMOD International Conference on Management of Data (SIGMOD '99), 1999, pp. 263-274). In these cases, a lack of user involvement with "fast and loose" progress has shortcomings; hence, data scientists may tend to prefer the more laborious but controlled approach discussed above.

As an example, an analyst may wish to compute the click-through-rate (CTR) for each advertisement (ad) using an example advertising platform. For example, the analyst may use two sub-queries ($Q_c$ and $Q_i$) to compute (per ad) the number of clicks and impressions, respectively. Each query may be non-trivial; for example, $Q_c$ may process clicks on a per-user basis to consider only legitimate (non-automated) clicks from a webpage whitelist. Further, $Q_i$ may process a different set of logged data. A final query $Q_{ctr}$ may join (for each ad) the results of $Q_c$ and $Q_i$, and may compute their ratio as the CTR. For example, FIG. 1 illustrates, as data 100, an example toy input 102 sorted by user, and the final results for $Q_c$, $Q_i$, and $Q_{ctr}$.

As shown in FIG. 1, the example toy input 102 includes click data sorted by user. As shown in FIG. 1 example impression data 104 may illustrate ad impression data sorted by user. The example final result of query $Q_c$ (number of clicks per ad) is depicted as final result 106, and the example final result of query $Q_i$ (number of impressions per ad) is depicted as final result 108. As shown in FIG. 1, the example result of final query $Q_{ctr}$ is depicted as final result 110.

For example, FIG. 2 illustrates progressive results 200 for the same queries $Q_c$ and $Q_i$. Without user involvement in defining progressive samples, the exact sequence of progressive counts may be nondeterministic across runs, although the final counts are precise. Further, depending on the relative speed and sequence of results for $Q_c$ and $Q_i$, $Q_{ctr}$ may compose arbitrary progressive results, resulting in substantial variations in progressive CTR results. As shown in FIG. 2, an example progressive query $Q_c$ (number of clicks per ad) result is depicted as progressive result 202, and an example progressive query $Q_i$ (number of impressions per ad) result is depicted as progressive result 204. As further shown in FIG. 2, a first possible progressive $Q_{ctr}$ result is depicted as progressive result 206, and a second possible progressive $Q_{ctr}$ result is depicted as progressive result 208.

For example, a CTR of 2.0 results from combining the first tuple from $Q_c$ and $Q_i$. Some results that are not even meaningful (e.g., CTR>1.0) are possible. Although both results eventually arrive at the same final CTR, there is no mechanism to ensure that the inputs being correlated to compute progressive CTRs are deterministic and comparable (e.g., computed using the same sample of users).

The above example illustrates several challenges:
1) User-Control: Data scientists usually have domain expertise that they may leverage to select from a range of sampling strategies based on their specific needs and context. In the example of FIG. 1, both datasets may be progressively sampled identically in user-order for meaningful progress, avoiding the join sampling problem (see, e.g., S. Chaudhuri et al., supra). Users may also desire more flexibility; for example, with a star-schema dataset, they may wish to fully process the small dimension table before sampling the fact table, for improvement in progressive results.
2) Semantics: Relational algebra provides precise semantics for SQL queries. Given a set of input tables, the correct output is defined by the input and query alone, and is independent of dynamic properties such as the order of processing tuples. However, for complex queries, conventional AQP systems may use operational semantics, where early results may be determined on a best-effort basis. Thus, it may be unclear what a particular early result means to the user.
3) Repeatability and Optimization: Two runs of a query in AQP may provide a different sequence of early results, although they both converge to the same final answer. Thus, without limiting the class of queries which are progressively executed, it may be problematic to understand what early answers mean, or even to recognize anomalous early answers. Further, changing the physical operators in the plan (e.g., changing operators within the ripple join family (see, e.g., P. J. Haas et al., "Ripple joins for online aggregation," In Proceedings of the 1999 ACM SIGMOD International Conference on Management of Data (SIGMOD '99), 1999, pp. 287-298) may substantially change what early results are seen).

4) Provenance: Users may not easily establish the provenance of early results, e.g., link an early result (CTR=3.0) to particular contributing tuples, which may be useful to debug and reason about results.

5) Query Composition: The issue of using operational semantics may be exacerbated when a user starts to compose queries. The example discussed above shows that the user may get widely varying results (e.g., spurious CTR values) that may be problematic to reason about.

6) Scale-Out: Performing progressive analytics at scale may exacerbate the above challenges. As shown in FIG. 3, the CTR query from the example discussed above is expressed (300) as two map-reduce (MR) jobs that partition data by UserId (partitions 302, 304), feeding a third job that partitions data by a different key (AdId) (partition 306). In a complex distributed multi-stage workflow, accurate deterministic progressive results can be advantageous. Map-reduce-online (MRO) (see, e.g., T. Condie et al., "MapReduce online," *In Proceedings of the 7th USENIX conference on Networked systems Design and Implementation* (NSDI'10), 2010, pp. 21-21) adds a limited form of pipelining to MR, but MRO reports a heuristic progress metric (average fraction of data processed across mappers) that does not resolve the issues discussed above.

Thus, for example, data scientists may utilize user-controlled progressive sampling because it may help to avoid the above issues, but the lack of system support may result in a tedious and error-prone workflow that may preclude the reuse of work across progressive samples.

In accordance with example techniques discussed herein, an example system may (1) allow users to communicate progressive samples to the system; (2) allow efficient and deterministic query processing over progressive samples, without the system itself trying to reason about specific sampling strategies or confidence estimation; and yet (3) continue to provide advantageous features as outlined above.

As further discussed herein, an example progress model may be particularly suitable for progressive analytics on big data in the Cloud, since queries in this setting may be complex, and memory- and CPU-intensive. Conventional scalable distributed frameworks such as MR are not pipelined, which may render them unsuitable for progressive analytics. MRO adds pipelining, but may not provide semantic underpinnings of progress for achieving many features outlined above.

As discussed further herein, an example framework for progressive analytics may run on a system such as WINDOWS AZURE, as it understands and propagates progress (based on the example progress model) as a first-class citizen inside the framework. Such an example architecture may generalize the data-parallel MR model and support progress-aware reducers that understand explicit progress in the data. In particular, the example architecture may work with a temporal engine (e.g., STREAMINSIGHT—see, e.g., M. Ali et al., "Microsoft CEP Server and Online Behavioral Targeting," In Proceedings of the VLDB Endowment, Vol. 2, Issue 2, August 2009, pp. 1558-1561) as a progress-aware reducer to enable scaled-out progressive relational (SQL) query support in the Cloud. For example, the architecture may provide:

(1) Fully pipelined progressive computation and data movement across multiple stages with different partitioning keys, avoiding a substantial cost of sending intermediate results to Cloud storage.

(2) Elimination of sorting in the framework using progress-ordered data movement, partitioned computation pushed inside progress-aware reducers, and support for the conventional reducer application programming interface (API).

(3) Progress-based merge of multiple map outputs at a reducer node.

(4) Concurrent scheduling of multi-stage map and reduce jobs with a scheduling policy and flow control scheme.

Further, the example architecture may be extended with a high performance mode that eliminates disk writes, and may provide high availability (by leveraging progress semantics) and straggler management.

One skilled in the art of data processing will appreciate that there may be many ways to accomplish the distributed progressive analytics discussed herein, without departing from the spirit of the discussion herein.

II. Example Operating Environment

Features discussed herein are provided as example embodiments that may be implemented in many different ways that may be understood by one of skill in the art of data processing, without departing from the spirit of the discussion herein. Such features are to be construed only as example embodiment features, and are not intended to be construed as limiting to only those detailed descriptions.

Figure 4:
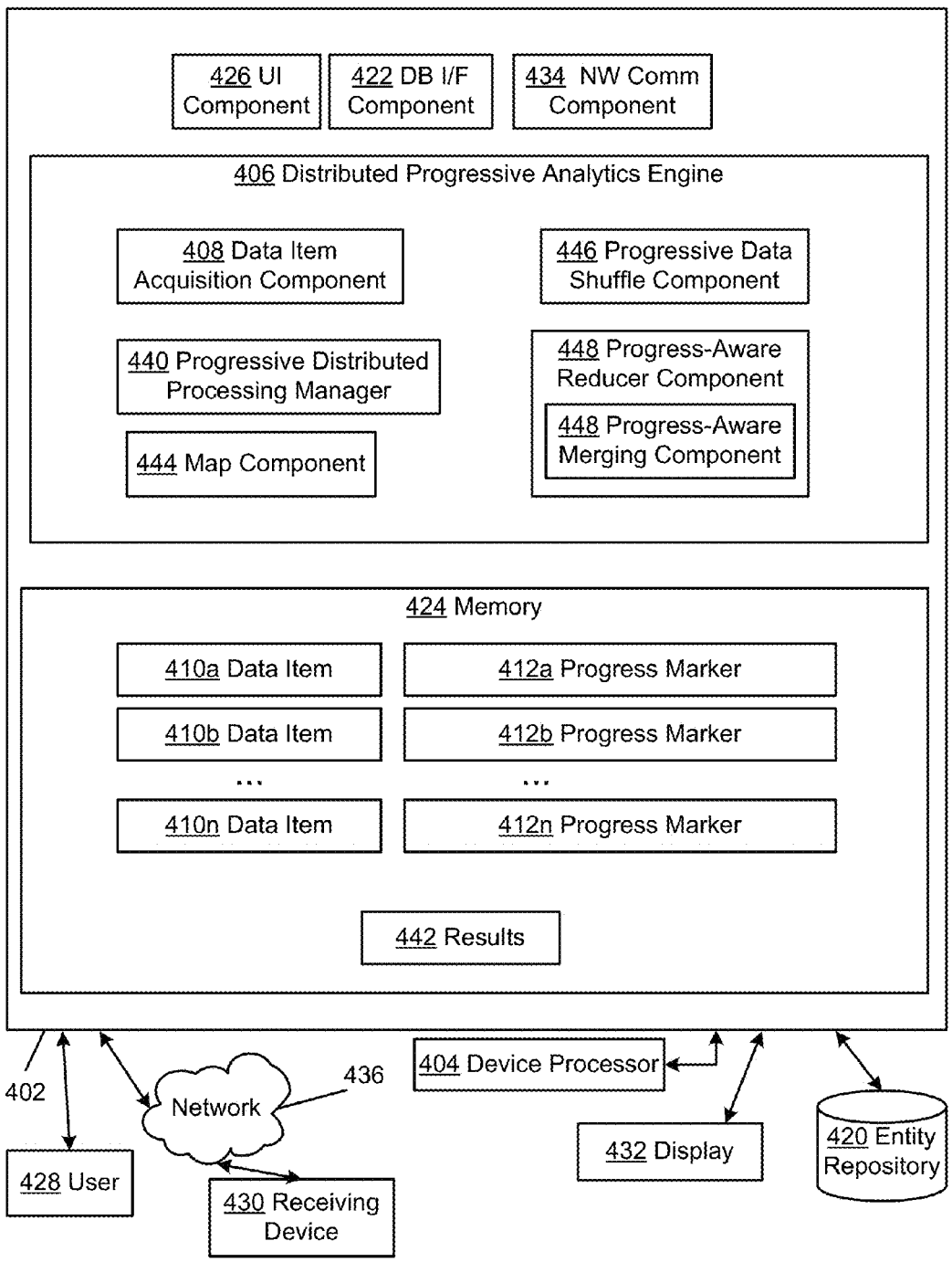
FIG. 4 is a block diagram illustrating of an example system for distributed progressive analytics.

As further discussed herein, FIG. 4 is a block diagram of a system 400 for progressive data analytics. One skilled in the art of data processing will appreciate that system 400 may be realized in hardware implementations, software implementations, or combinations thereof. As shown in FIG. 4, a system 400 may include a device 402 that includes at least one processor 404. The device 402 may include a distributed progressive analytics engine 406 that may include a data item acquisition component 408 that may be configured to obtain a plurality of data items 410a, 410b, . . . , 410n that are annotated with progress markers 412a, 412b, . . . , 412n indicating progress points associated with atemporal processing progress of the respective data items 410a, 410b, . . . , 410n. For example, the data items 410a, 410b, . . . , 410n may include progressive results of queries.

For example, as part of a progress model (e.g., a progressive sampling model), users may encode their chosen progressive sampling strategy into the data by augmenting tuples with explicit progress intervals (PIs). For example, PIs may denote logical points where tuples enter and exit the computation, and explicitly assign tuples to progressive samples. For example, PIs may offer substantial flexibility for encoding sampling strategies and ordering for early results, including arbitrarily overlapping sample sequences and special cases such as the star-schema join mentioned above.

According to an example embodiment, the distributed progressive analytics engine 406, or one or more portions thereof, may include executable instructions that may be stored on a tangible computer-readable storage medium, as discussed below. According to an example embodiment, the computer-readable storage medium may include any number of storage devices, and any number of storage media types, including distributed devices.

In this context, a "processor" may include a single processor or multiple processors configured to process instructions associated with a processing system. A processor may thus include one or more processors processing instructions in parallel and/or in a distributed manner. Although the device processor 404 is depicted as external to the distributed progressive analytics engine 406 in FIG. 4, one skilled in the art of data processing will appreciate that the device processor 404 may be implemented as a single component, and/or as distributed units which may be located internally or externally to the distributed progressive analytics engine 406, and/or any of its elements.

For example, the system 400 may include one or more processors 404. For example, the system 400 may include at least one tangible computer-readable storage medium storing instructions executable by the one or more processors 404, the executable instructions configured to cause at least one data processing apparatus to perform operations associated with various example components included in the system 400, as discussed herein. For example, the one or more processors 404 may be included in the at least one data processing apparatus. One skilled in the art of data processing will understand that there are many configurations of processors and data processing apparatuses that may be configured in accordance with the discussion herein, without departing from the spirit of such discussion.

In this context, a "component" may refer to instructions or hardware that may be configured to perform certain operations. Such instructions may be included within component groups of instructions, or may be distributed over more than one group. For example, some instructions associated with operations of a first component may be included in a group of instructions associated with operations of a second component (or more components). For example, a "component" herein may refer to a type of functionality that may be implemented by instructions that may be located in a single entity, or may be spread or distributed over multiple entities, and may overlap with instructions and/or hardware associated with other components.

According to an example embodiment, the distributed progressive analytics engine 406 may be implemented in association with one or more user devices. For example, the distributed progressive analytics engine 406 may communicate with a server, as discussed further below.

For example, an entity repository 420 may include one or more databases, and may be accessed via a database interface component 422. One skilled in the art of data processing will appreciate that there are many techniques for storing repository information discussed herein, such as various types of database configurations (e.g., relational databases, hierarchical databases, distributed databases) and non-database configurations.

According to an example embodiment, the distributed progressive analytics engine 406 may include a memory 424 that may store the data items 410a, 410b, . . . , 410n. In this context, a "memory" may include a single memory device or multiple memory devices configured to store data and/or instructions. Further, the memory 424 may span multiple distributed storage devices. Further, the memory 424 may be distributed among a plurality of processors.

According to an example embodiment, a user interface component 426 may manage communications between a user 428 and the distributed progressive analytics engine 406. The user 428 may be associated with a receiving device 430 that may be associated with a display 432 and other input/output devices. For example, the display 432 may be configured to communicate with the receiving device 430, via internal device bus communications, or via at least one network connection.

According to example embodiments, the display 432 may be implemented as a flat screen display, a print form of display, a two-dimensional display, a three-dimensional display, a static display, a moving display, sensory displays such as tactile output, audio output, and any other form of output for communicating with a user (e.g., the user 428).

According to an example embodiment, the distributed progressive analytics engine 406 may include a network communication component 434 that may manage network communication between the distributed progressive analytics engine 406 and other entities that may communicate with the distributed progressive analytics engine 406 via at least one network 436. For example, the network 436 may include at least one of the Internet, at least one wireless network, or at least one wired network. For example, the network 436 may include a cellular network, a radio network, or any type of network that may support transmission of data for the distributed progressive analytics engine 406. For example, the network communication component 434 may manage network communications between the distributed progressive analytics engine 406 and the receiving device 430. For example, the network communication component 434 may manage network communication between the user interface component 426 and the receiving device 430.

A progressive distributed processing manager 440 may be configured to initiate deterministic, massively parallel, progressive processing of the plurality of data items 410a, 410b, . . . , 410n on a plurality of devices, the progress markers 412a, 412b, . . . , 412n indicating which of the plurality of data items 410a, 410b, . . . , 410n are to be incorporated into results 442 of the progressive processing, the progress markers 412a, 412b, . . . , 412n further indicating an ordering for incorporation of the respective data items 410a, 410b, . . . , 410n into the results 442.

For example, progress markers may propagate through progress model operators. Combined with progressive operator semantics, the progress markers may provide closed-world determinism: the exact sequence of early results is a deterministic function of augmented inputs and the logical query. They may be independent of physical plans, which may enable side-effect-free query optimization.

For example, provenance is explicit; result tuples have progress markers that denote a substantially exact set of contributing inputs. The progress model may also allow meaningful query composition, as operators respect progress markers. For example, if desired, users may encode confidence interval computations as part of their queries.

As discussed further herein, a progressive in-memory relational engine based on the example progress model may be realized using an unmodified temporal streaming engine, for example, by reusing its temporal fields to denote progress. For example, tuples from successive progressive samples may be incrementally processed when possible, providing a substantial performance benefit. As further discussed herein, the temporal engine may be unaware that it is processing atemporal relational queries, as its temporal fields may simply be re-interpreted to denote progress points. While it may appear that in-memory queries may be memory intensive since the final answer is computed over the entire dataset, the example progress model may allow users to exploit sort orders and foreign key dependencies in the input data and queries to reduce memory usage substantially.

The example progress model may generalize AQP, as example progress semantics are compatible with queries for which conventional AQP techniques with statistical assurances apply, and thus may not have an expectation of user involvement. These techniques correspond to different progress marker assignment policies for input data. For example, variants of ripple join (see, e.g., P. J. Haas et al., supra) involve different progress marker assignments for a temporal symmetric-hash-join, with confidence intervals computed as part of the query. Thus, the example progress model is orthogonal to, and may be able to leverage this area of conventional work, while additionally providing a benefit of repeatable and deterministic semantics.

As further discussed herein, the example progress model may define a logical progress domain $\mathcal{P}$ as the range of non-negative integers $[0, \infty)$. For example, progress made by a query may be explicitly indicated by a progress point $p \in \mathcal{P}$. For example, a progress point indicated as "$\infty$" herein may indicate a final answer to the computation. In this context, "$\infty$" may refer to maxval, or a predefined (or otherwise determined) maximal value attributed with values in the range of the logical progress domain $\mathcal{P}$.

Further, for example, a progress interval (PI) from the progress domain may be associated to every tuple in the input data (e.g., to indicate the progress marker). More formally, each tuple $\mathcal{T}$ may be augmented with two attributes, a "progress-start," indicated as $P^+$ and a "progress-end," indicated as $P^-$, that jointly denote a PI, indicated as $[P^+, P^-)$. For example, $P^+$ may indicate the progress point at which a tuple $\mathcal{T}$ starts participating in the computation, and $P^-$ may indicate the progress point at which tuple $\mathcal{T}$ stops contributing to the computation. All input tuples may have user or system-provided $P^+$ values based on the progress semantics implemented by a particular user. For example, every progressive sampling strategy may include some equivalent PI assignment. For example, in a common case of inclusive samples (e.g., wherein each sample is a superset of the previous one), all input tuples may have $P^-$ set to 1. For example, with non-inclusive samples, input tuples may have a finite $P^-$, and may reappear with a greater $P^+$ for a later sample.

In accordance with example techniques discussed herein, every logical relational operator O may have a progressive counterpart, which computes augmented output tuples from augmented input tuples. For example, logically, the output at progress point p is the operation O applied to input tuples whose PIs are stabbed by p (e.g., the extension to user-defined operators may be substantially identical). In this context, the term "stabbed" refers to the progress point p including all of the progress intervals that contain progress point p within the interval, e.g., for an interval [LE, RE) then p lies within LE and RE. Thus, progressive operators may be composed meaningfully to produce progressive queries. The example output of a progressive query may be a deterministic function of the (augmented) input data and the logical query alone.

For example, the $P^-$ for an output tuple may not always be known at the same time as its $P^+$ is known. Thus, an operator may output a tuple having an eventual PI of $[P^+, P^-)$ in two separate pieces: (1) at progress point $P^+$, it generates a tuple $T_1$ with a PI $[P^+, \infty)$ indicating that the tuple participates in the result forever; (2) at the later progress point $P^-$, it generates an update $T_2$ with the actual PI $[P^+, P^-)$. In this context, the term "progress-sync" may refer to the progress point associated with a tuple (or its subsequent update). For example, tuple $T_1$ has a progress-sync of $P^+$, whereas tuple $T_2$ has a progress-sync of $P^-$.

Somewhat similarly to conventional databases, each logical progressive operator may have multiple equivalent physical operators. For example, every physical operator both processes and generates augmented tuples in non-decreasing progress-sync order. The eventual $P^-$ values for early results that are refined later are less than the maxval (e.g., $\infty$), to indicate that the result is not final. For example, a Count operator may incrementally revise its progressive count output as it processes more data.

In accordance with example techniques discussed herein, early results in the example progress model may provide provenance that may help debug and reason about early results: the set of output tuples with PIs stabbed by progress point p may denote the progressive result of the query at p. For example, the provenance of these output tuples may include all tuples along their input paths whose PIs are stabbed by p. In summary, an example progress model output for a relational query Q may be indicated as follows:

Associated with each input tuple is a progress interval (PI). For example, at every unique progress point p across all PI endpoints in the input data, there exists a set $O_p$ of output results with PIs stabbed by p. $O_p$ may be defined to be the result of the query Q evaluated over input tuples with PIs stabbed by p.

The example progress model may be viewed as a generalization of relational algebra with progressive sampling as a first-class concept. Relational algebra may prescribe the final answer to a relational query but may not cover how a user may arrive there using partial results. For example, the example progress model algebra may explicitly specify, for any query, not only the final answer, but every intermediate (e.g., progressive) result and its position in the progress domain.

FIG. 5 illustrates example progressive results 500 using augmented input data. For example, FIG. 5 illustrates augmented input data 502, 504, where the PI for user $u_i$ may be set as $[i, \infty)$. A new progressive result may be produced at every progress point (in the input data). Thus, PIs may be more coarse-grained in practice (e.g., $P^+$ may be incremented every 1000 users).

FIG. 5 further illustrates the results of $Q_c$ and $Q_i$. For example, a result 506 of query $Q_c$ and a result 508 of query $Q_i$ each produce a progressive count of 1 at progress point 0, which revised to 2 and 3 at progress points 1 and 2. As a result, the PIs for these tuples are $[0, 1)$, $[1, 2)$ and $[2, \infty)$ respectively.

For example, an example progressive result 510 of query $Q_{ctr}$ illustrates a notion that every CTR may be meaningful as it is computed on some prefix of users (for the example progress assignment), and CTR provenance is provided by PIs. Further, these progressive results may be fixed for a given input and logical query. As shown in FIG. 5, the final CTR of 0.6 is the only tuple active at progress point $\infty$.

Figure 6:
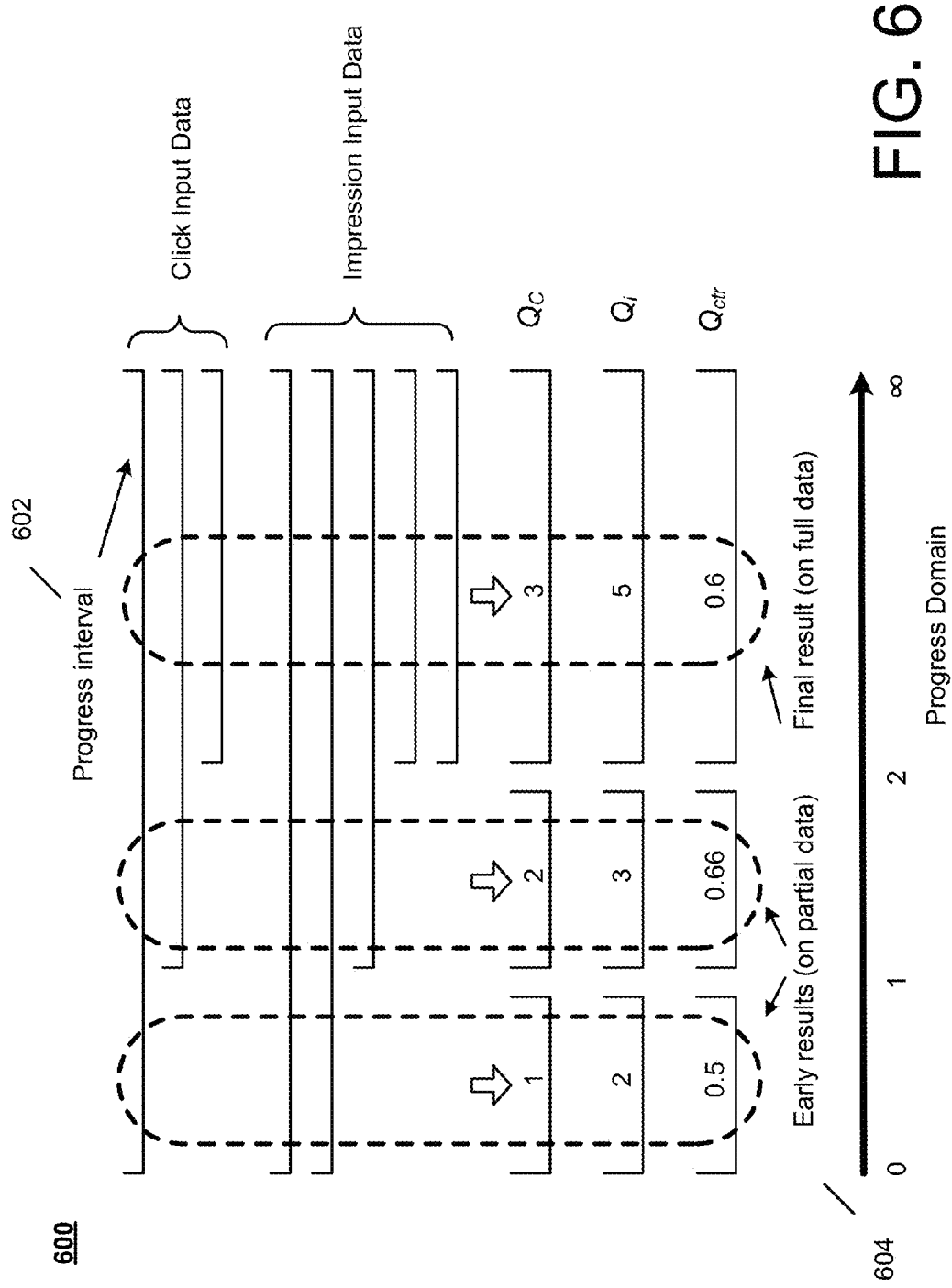
FIG. 6 depicts example progress intervals and query computation for the example of FIG. 5.

FIG. 6 depicts results 600 as example PIs 602 and query computation 604 for the example of FIG. 5.

In accordance with example techniques discussed herein, a database engine may be modified to add PI support to all operators in the engine. However, an example progress model as discussed herein may be realized without incurring this effort. For example, a stream processing engine (SPE) may be leveraged as the progressive query processor. In particular, the semantics underlying a temporal SPE such as NILE (see, e.g., M. Hammad et al. "Nile: A query processing engine for data streams," *In Proceedings of the 20th International Conference on Data Engineering* (ICDE), 2004), STREAM (see, e.g., B. Babcock et al., "Models and issues in data stream systems," *In Proceedings of the twenty-first ACM SIGMOD-SIGACT-SIGART Symposium on Principles of Database Systems* (PODS '02), 2002, pp. 1-16), or STREAMINSIGHT (see, e.g., M. Ali et al., supra) (based on temporal databases (see, e.g., C. Jensen et al., "Temporal specialization," In Proceedings of the 8th International Conference on Data Engineering, 1992, pp. 594-603)) may be leveraged to denote progress, advantageously with incremental processing across samples when possible. With STREAMINSIGHT's temporal model, for example, the event validity time interval (see, e.g., R. Barga et al., "Consistent streaming through time: A vision for event stream processing," 3rd Biennial Conference on Innovative Data Systems Research (CIDR), Jan. 7-10, 2007, pp. 363-374) [$V_s$, $V_e$) directly denotes the PI [$P^+$, $P^-$). For example, $T_1$ is an insertion and $T_2$ is a retraction (or revision). Likewise, $T_1$ and $T_2$ may correspond to Istreams and Dstreams in STREAM, and positive and negative tuples in NILE. For example, the input tuples converted into events may be fed to a continuous query corresponding to the original atemporal SQL query. The unmodified SPE may then operate on these tuples as though they were temporal events, and may produce output events with timestamp fields that may be re-interpreted as tuples with PIs.

For example, with this construction, the SPE may be unaware that it is being used as a progressive SQL processor. For example, it may process and produce events whose temporal fields may be re-interpreted to denote progress of an atemporal (relational) query. For example, the temporal symmetric-hash-join in an SPE may effectively compute a sequence of joins over a sequence of progressive samples efficiently. The resulting query processor may transparently handle all of SQL, including user-defined functions, with the features of the example progress model.

The choice of a progressive sampling strategy for PI assignment may be orthogonal to the example progress model. For example, it may be controlled by data scientists to ensure quicker and more meaningful early results, either directly or using a layer between the system and the user. For online aggregation, a pre-defined random order may be used for faster convergence. Active learning (see, e.g., D. Cohn et al., supra) may change the sampling strategy based on outcomes from prior samples. For example, PIs may be assigned in join key order across inputs for equi-join. The example of FIG. 5 discussed above may assign $P^+$ in UserId order. With a star-schema, all tuples in the small dimension table may be set to have a PI of [0, ∞), while progressively sampling from the fact table as [0, ∞), [1, ∞), . . . .

Thus, conventional proposals for ordering data for quick convergence (see, e.g., P. J. Haas et al., "Join algorithms for online aggregation," *IBM Research Report RJ* 10126, 1998; P. J. Haas et al., "Ripple joins for online aggregation," *In Proceedings of the* 1999 *ACM SIGMOD International Conference on Management of Data* (SIGMOD '99), 1999, pp. 287-298; N. Pansare et al., "Online aggregation for large MapReduce jobs," *In Proceedings of the 37$^{th}$ International Conference on Very Large Databases* (VLDB'11), Aug. 29-Sep. 3, 2011; S. Chaudhuri et al., "Effective use of block-level sampling in statistics estimation," *In Proceedings of the* 2004 *ACM SIGMOD International Conference on Management of Data* (SIGMOD '04), 2004, pp. 287-298) may correspond to different PI assignment schemes in the example progress model discussed herein.

Given a base PI assignment based on a sampling strategy, progress reporting granularity may further be controlled by adjusting the way $P^+$ moves forward: setting $P^+$ to [$P+/1000$] in the running example input produces a progressive result after each chunk of 1000 users (which may be referred to herein as a progress-batch) is processed. For example, another alternative that may be utilized by data scientists may involve starting with small progress-batches to obtain substantially quick estimates, and then increasing batch sizes (e.g., exponentially) as diminishing returns are observed with more data.

Query processing using an in-memory streaming engine may be expensive, as the final answer is over the entire dataset. The example progress model discussed herein may enable performance optimizations that may improve performance substantially in practical situations. For example, a computation $Q_c$ may be partitionable by UserId. For example, the compile-time property that progress-sync ordering may be substantially the same as (or correlated to) the partitioning key, may be exploited to reduce memory usage, and consequently, throughput. For example, intuitively, although every tuple with PI [$P^+$, ∞) logically has a $P^-$ of ∞, it does not contribute to any progress point beyond $P^+$. Thus, $P^-$ may be temporarily set to $P^+$+1 before feeding the tuples to the SPE. For example, this may effectively cause the SPE to not have to retain information related to progress point $P^+$ in memory, once computation for $P^+$ is done. For example, the result tuples may have their $P^-$ set back to ∞ (e.g., maxval) to retain the original query semantics (e.g., these query modifications may be introduced using compile-time query rewrites).

Similarly, in case of an equi-join operation, if the progress-sync ordering is correlated to the join key, a similar $P^-$ adjustment may be used to ensure that the join synopses do not retain tuples across progress points, since a tuple may be assured to not join with any other tuple with a larger $P^+$.

Figure 7:
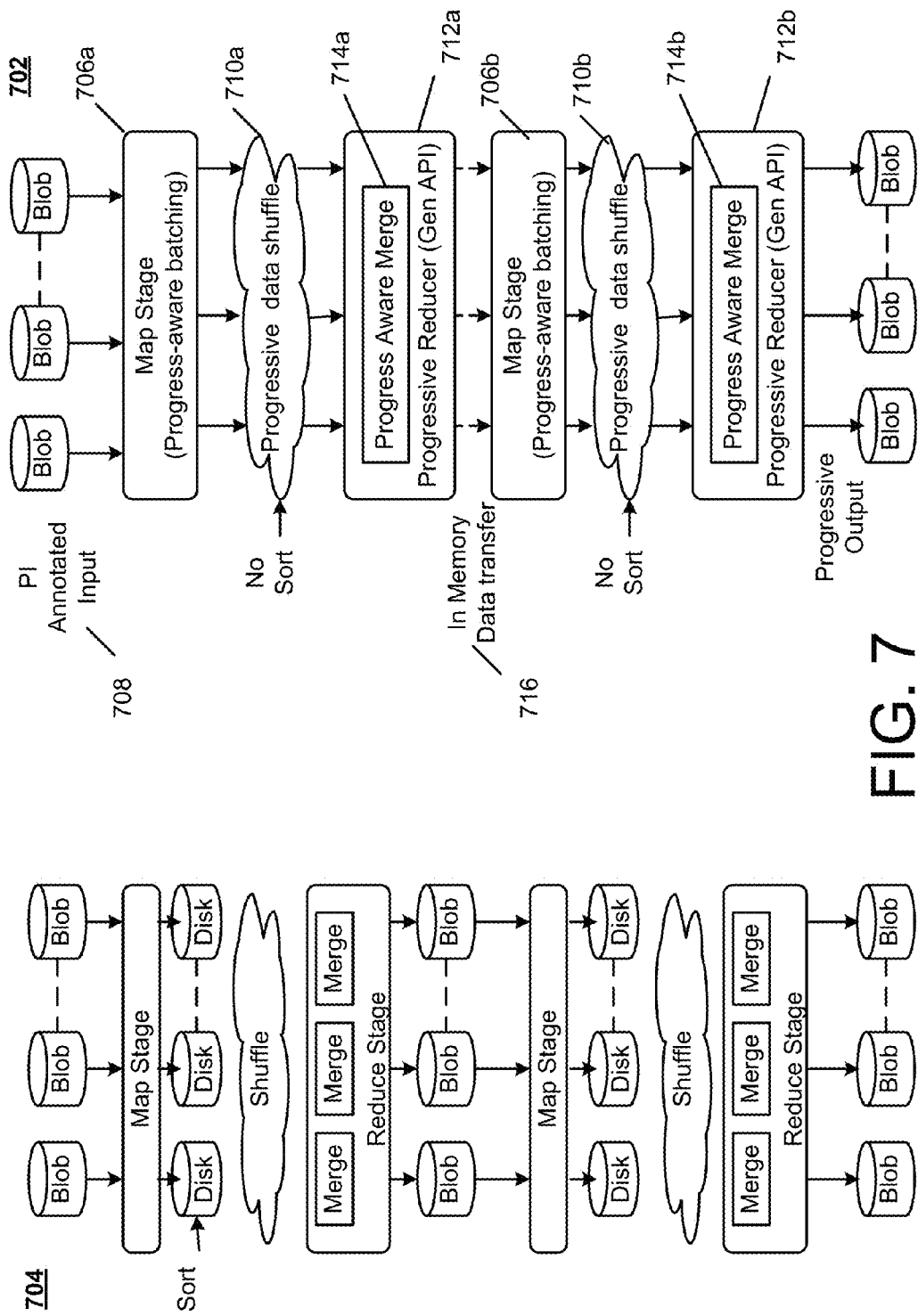
FIG. 7 illustrates an example progressive data-parallel computation framework as compared to another map-reduce system, for a query with two stages and different partitioning keys.

As discussed further herein, an example progressive data-parallel computation framework may be based on the MapReduce (MR) computation paradigm (see, e.g., J. Dean et al., "MapReduce: simplified data processing on large clusters," *In Proceedings of the 6th Symposium on Operating Systems Design & Implementation* (OSDI'04), Vol. 6, 2004), at a high level. FIG. 7 illustrates an example progressive data-parallel computation framework 702 as compared to conventional MR 704, for a query with two stages and different partitioning keys. For example, blobs (binary large objects) in the figure may indicate the format of input and output data on WINDOWS AZURE's distributed Cloud storage, and may be replaced by any distributed persistent storage such as HADOOP Distributed File System (HDFS).

As discussed further herein, the progressive data-parallel computation framework (702) may provide progress-aware data flow, as the framework may implement the example progress model discussed herein and may provide support for data flow, for example, in strict progress-sync order. Example components of progress-aware data flow may include:

(1) Batching 706: the example framework may read input data 708 annotated with PIs (progressive samples) and may create batches of tuples with the same progress-sync. Data movement in the example framework 702 may be fully pipelined in terms of these progress-batches, in progress-sync order.

(2) Sort-free data shuffle 710: MR sorts the map output by key, followed by a merge to enable grouping by key at reducers 712. This sort-merge operation in MR may involve a performance bottleneck (see, e.g., B. Li et al., "A platform for scalable one-pass analytics using MapReduce," *In Proceedings of the* 2011 *ACM SIGMOD International Conference on Management of Data* (SIGMOD '11), June 2011, pp. 985-996). In contrast, the batched map output in the example framework 702 may be partitioned and shuffled across the network to reducers 712 without sorting, thus retaining progress-sync order.

(3) Progress-aware merge 714: A progress-aware merge 714 at reducers 712 may enable the example progress model for progressive query results. For example, each reducer 712 may group together batches received from different mappers 706, that belong to the same PI, into a single progress-batch, and may ensure that all progress-batches are processed in strict progress-sync order, thus providing a global progress-sync order for progress-batches in the framework, along all data flow paths.

As discussed further herein, the example framework 702 may provide progress-aware reducers 712, that accept and provide augmented tuples in progress-sync order, and logically adhere to the example progress model query model. The progress-aware merge 714 may generate progress-batches in progress-sync order; these may be fed directly to reducers 712 that provide early results in progress-sync order. For example, a user may write custom reducers, or the user may utilize an unmodified SPE as a progress-aware reducer for progressive relational queries.

As discussed further herein, the example framework 702 may provide a multi-stage system with flow control. For example, the example framework 702 may support concurrent scheduling of all jobs in a multi-stage query and co-location of mappers of dependent jobs with the reducers of feeding jobs on the same slave machine. For example, data transfer between jobs may occur in-memory (716), providing substantial savings in a Cloud deployment where blob access may be expensive. The example framework may also provide end-to-end flow control to avoid buffer overflows at intermediate stages and may ensure a data flow that can be sustained by downstream consumers. For example, the progressive distributed processing manager 440 may be configured to initiate the deterministic, massively parallel, progressive processing that includes concurrent scheduling of multi-stage map and reduce jobs with a scheduling policy and flow control scheme.

As discussed further herein, the example framework 702 may provide in-memory data processing. For example, the example framework 702 may materialize map output on disk to provide improvement in data availability during failure recovery. For example, a high-performance in-memory mode may be supported, for improvement in interactivity.

As discussed further herein, the example framework 702 may provide data flow that is at the granularity of progress-batches and that is governed by PIs.

As discussed further herein, the input data 708 may be partitioned into a number of input splits (e.g., one for each mapper 706), each of which is progress-sync ordered. For example, the mapper 706 may read its input split as progress annotated tuples (e.g., progressive samples), and may invoke the user's map function. The resulting augmented key-value pairs may be partitioned by key to provide a sequence of progress-batches for each partition (e.g., downstream reducer). For example, a progress batch may include all tuples with the same progress-sync value (within the specific partition) and may have a unique ID. For example, each progress-batch sequence may be in strictly increasing progress-sync order.

For example, the input text reader may append an end-of-file (eof) marker to the mapper's input when it reaches the end of its input split. The mapper, on receipt of the eof marker, may append it to all progress-batch sequences.

For example, the batching granularity in the framework 702 may be determined by the PI assignment scheme of the input data 708. The example framework 702 may also provide a "control knob" to the user, for example, in terms of a parameterized batching function, to vary the batching granularity of the map output as a factor of the PI annotation granularity of the actual input. For example, this may avoid re-annotating the input data 708 with PIs if the user decides to alter the granularity of the progressive output.

FIG. 8 illustrates example annotated input data and example, progress-batches (800). For example, FIG. 8 illustrates a PI annotated input split 802 with three progressive samples. For example, a corresponding batched map 804 may be output, where each tuple in a batch has the same (or substantially the same) progress-sync value. For example, progress granularity may be varied (806) using a batching function that modifies $P^+$. In this example, $$P^+ = \left\lfloor \frac{P+}{b} \right\rfloor$$

is the example batching function, with the batching parameter b set to 2.

As discussed further herein, the example framework 702 may shuffle data between the mappers and reducers in terms of progress-batches without sorting. As an additional performance enhancement, the example framework 702 may support a mode for in-memory transfer of data between the mappers and reducers with flow control to avoid memory overflow. For example, progress-batches may be pipelined from the mapper to the reducers using an example fine-grained signaling mechanism, which may enable the mappers to inform the job tracker (e.g., the master) the availability of a progress-batch. The job tracker may then pass the progress-batch ID and location information to the appropriate reducers, triggering the respective map output downloads.

For example, the download mechanism on the reducer side may support progress-sync ordered batch movement. For example, each reducer may maintain a separate blocking concurrent queue or BCQ for each mapper associated with the job. For example, the BCQ may include a lock-free in-memory data structure that may support concurrent enqueue and dequeue operations and may enable appropriate flow control to avoid swamping of the reducer. For example, the maximum size of the BCQ may be a tunable parameter which may be set according to the available memory at the reducer.

For example, the reducer may enqueue progress-batches, downloaded from each mapper, into the corresponding BCQ associated with the mapper, in strict progress-sync order. For example, this batched sequential mode of data transfer relieves a need for continuous connections to be maintained between mappers and reducers, which may aid scalability.

For example, referring to FIG. 4, a map component 444 may be configured to initiate progress-aware batching of sets of the plurality of data items 410a, 410b, . . . , 410n, and progress-aware data flow of the plurality of data items 410a, 410b, . . . , 410n, as part of progress-aware map-reduce operations that are included in the progressive processing.

For example, a progressive data shuffle component 446 may be configured to initiate sort-free progressive data shuffling, using grouping of sets of the plurality of data items 410a, 410b, . . . , 410n, the grouping based on progress markers 412a, 412b, . . . , 412n of respective data items 410a, 410b, . . . , 410n included in the sets.

For example, a progress-aware merging component 448 may be configured to initiate progress-aware merging of portions of the plurality of data items 410a, 410b, . . . , 410n.

For example, a progress-aware reducer component 450 may be configured to initiate the progress-aware merging of portions of the plurality of data items 410a, 410b, . . . , 410n of the progress-aware merging component 448, at a reducer stage, as part of progress-aware map-reduce operations that are included in the progressive processing.

For example, the map component 444 may be configured to pipeline progress-batches from the map component 444 to the progress-aware reducer component 450 based on a signaling mechanism for indicating an availability for pipelining of respective ones of the progress-batches to a job tracker.

For example, the progress-aware reducer component may include a blocking concurrent queue (BCQ) configured to perform lock-free in-memory concurrent enqueue and dequeue operations.

For example, the progress-aware reducer component 450 may be implemented by a user.

For example, the reducer stage may include a streaming temporal engine that processes the progress markers 412a, 412b, . . . , 412n substantially equivalently as processing of temporal fields.

For example, obtaining the plurality of data items 410a, 410b, . . . , 410n that are annotated with progress markers 412a, 412b, . . . , 412n may include receiving the plurality of data items 410a, 410b, . . . , 410n that include data tuples that are user-augmented with respective progress intervals that indicate logical points where the data tuples enter and exit portions of computation included in the progressive processing.

For example, the respective progress intervals that indicate logical points where the data tuples enter and exit portions of computation included in the progressive processing may be used to assign the respective data tuples to progressive samples.

Figure 9:
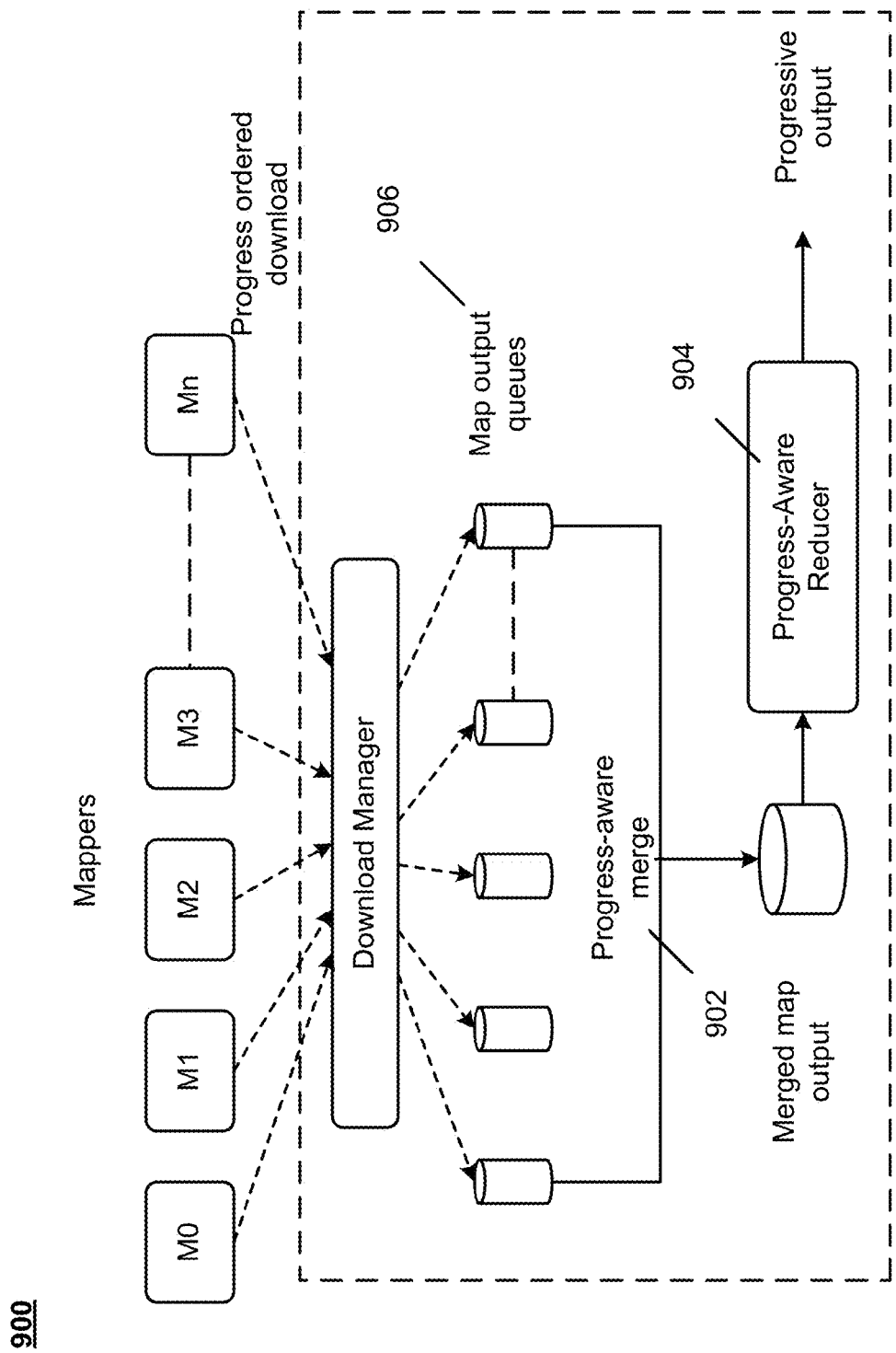
FIG. 9 illustrates an example high level design of a progress-aware merge module within a reducer.

As discussed further herein, the example framework 702 may implement the example progress model using a progress-aware merge mechanism 902 which may ensure flow of data in progress-sync order along all paths in the framework. FIG. 9 illustrates an example high level design 900 of a progress-aware merge module within each reducer 904. For example, once a map output is available in each of the map output queues 906, the reducer 904 may invoke the progress-aware merge mechanism 902, as shown in an example Algorithm 1:

---
Algorithm 1: Progress-aware merge
---
1  input  : # of Mappers M, $\mathcal{B}$ = {$q_1$, ..., $q_M$}, $c_{min}$, $\mathcal{H}$ = {$h_1$, ..., $h_M$}
2  output : Merged batch O
3  begin
4      O = Ø;
5      for each $q_i$ ∈ Q do
6        if ($h_i$ = = ∞) then continue;
7        progress-sync = peek ($q_i$); // peek blocks if $q_i$ = Ø;
8        if (progress-sync = = eof) then
9          $h_i$ = ∞; continue;
10       $h_i$ = progress-sync;

---
Algorithm 1: Progress-aware merge
---
11       if ($h_i$ = = $c_{min}$) then
12         O = O ∪ dequeue($q_i$);
13         progress-sync = peek($q_i$);
14         if (progress-sync = = eof) then $h_i$ = ∞;
15         else $h_i$ = progress-sync;
16
17     $c_{min}$ = min($\mathcal{H}$); return O;
18 end Algorithm 1

As shown, Algorithm 1 may accept as input (line 1) the number of mappers M, a set of BCQs $\mathcal{B}$ where $q_i$ ∈ $\mathcal{B}$ denotes the blocking concurrent queue for mapper i, the current progress-sync value $c_{min}$ of the merged batch to be produced (e.g., $c_{min}$ may be initialized to the minimum progress-sync across the heads of the BCQs), and $\mathcal{H}$, where $h_i$ ∈ $\mathcal{H}$ indicates the progress-sync value currently at the head of $q_i$ (e.g., $h_i$ may be initialized to the progress-sync value at the head of $q_i$).

As shown above, Algorithm 1 initializes an empty set O as output (line 4). It iterates over all mapper queues (lines 5-15) to find and dequeue the batches whose progress-sync values match $c_{min}$, adds them to O and updates $h_i$ to the new value at the head of $q_i$. It finally updates $c_{min}$ and returns O (line 17), a merged batch with all tuples having the same progress-sync value. O is then fed to the progressive reducer 904. If O=Ø, indicating end of input on all BCQs, the framework passes an eof marker to the progressive reducer signaling termination of input.

Let partition denote the set of keys that a particular reducer 904 is responsible for. In conventional MR, the reducer gathers all values for each key in the partition and invokes a reduce function for each key, passing the group of values associated with that key. The example framework 702 discussed herein may instead use progress-aware reducers 904 whose input is a sequence of progress-batches associated with that partition in progress-sync order. For example, the reducer 904 may be responsible for per-key grouping and computation, and may produce a sequence of progress-batches in progress-sync order as output. An example API for achieving this is shown below:

---
Unchanged map API:
  void map (K1 key, V1 value, Context context
Generalized Reduce API:
  void reduce ( Iterable <K2, V2 > input, Context context)
---

Here, V1 and V2 include PIs. The example framework 702 may also support the conventional reducer API to support older workflows, using a layer that groups active tuples by key for each progress point, invoking the conventional reduce function for each key, and using the reduce output to generate tuples with PIs corresponding to that progress point.

For example, while users may write custom progress-aware reducers, an unmodified temporal streaming engine (such as STREAMINSIGHT) may be used as a reducer to handle progressive relational queries (e.g., for progressive SQL). Streaming engines may process data in timestamp order, which matches with the progress-sync ordered data movement discussed herein. For example, temporal notions in events may be reinterpreted as progress points in the query. Further, streaming engines naturally handle efficient grouped subplans using hash-based key partitioning, which may be used to process tuples in progress-sync order.

As many analytics queries may need to be expressed as multistage MR jobs, the example framework may support a fully pipelined progressive job execution across different stages using concurrent job scheduling and co-location of processes that may need to exchange data across jobs.

The scheduler in the example framework 702 may be designed to receive all the jobs in a multi-stage query as a job graph, from the application controller (e.g., as part of concurrent job scheduling). For example, each job may be converted into a set of map and reduce tasks. For example, the scheduler may extract the type information from the job to construct a dependency table that tracks, for each task within each job, where it reads from and writes to (e.g., a blobs or some other job). For example, the scheduler may use this dependency table to partition map tasks into a set of independent map tasks $M_i$ which may read their input from a blob/HDFS, and a set of dependent map tasks $M_d$ whose input is the output of some previous stage reducer.

Similarly, reduce tasks may be partitioned into a set of feeder tasks $R_f$ that may provide output to mappers of subsequent jobs, and a set of output reduce tasks $R_o$ that write their output to a blob/HDFS.

Algorithm 2 below illustrates an example technique for scheduling the map and reduce tasks corresponding to different jobs:

---
Algorithm 2: Scheduling
---

```
1 input    : R_f; R_o; M_i; M_d, dependency table
2 begin
3    for each r ∈ R_f do
4       Dispatch r;
5       if Dispatch successful then Make a note of tracker ID;
6    for each r ∈ R_o do Dispatch r;
7    for each m ∈ M_d do
8       Dispatch m, co-locating it with its feeder reducer;
9    for each m ∈ M_i do
10      Dispatch m closest to input data location;
11
12 end
                    Algorithm 2
```

As shown in Algorithm 2, all the reduce tasks in $R_f$ may be scheduled (lines 3-5) on slave machines that have at least one map slot available to schedule a corresponding dependent map task in $M_d$ which would consume the feeder reduce task's output. The scheduler maintains a state of the task tracker IDs of the slave machines on which these feeder reduce tasks have been scheduled (line 5).

At line 6, all the reducers in $R_o$ may be scheduled depending on the availability of reduce slots on various slave machines in a round robin manner. At lines 7-8, all the map tasks in $M_d$ are dispatched, co-locating them with the reducers of the previous stage in accordance with the dependency table and using the task tracker information retained by the algorithm. At lines 9-10, all the map tasks in $M_i$ are scheduled closest to the input data location. For example, placing tasks in this order may ensure that if there exists a feasible placement of all MR tasks that would satisfy all job dependencies, such a placement will be found.

Figure 10B:
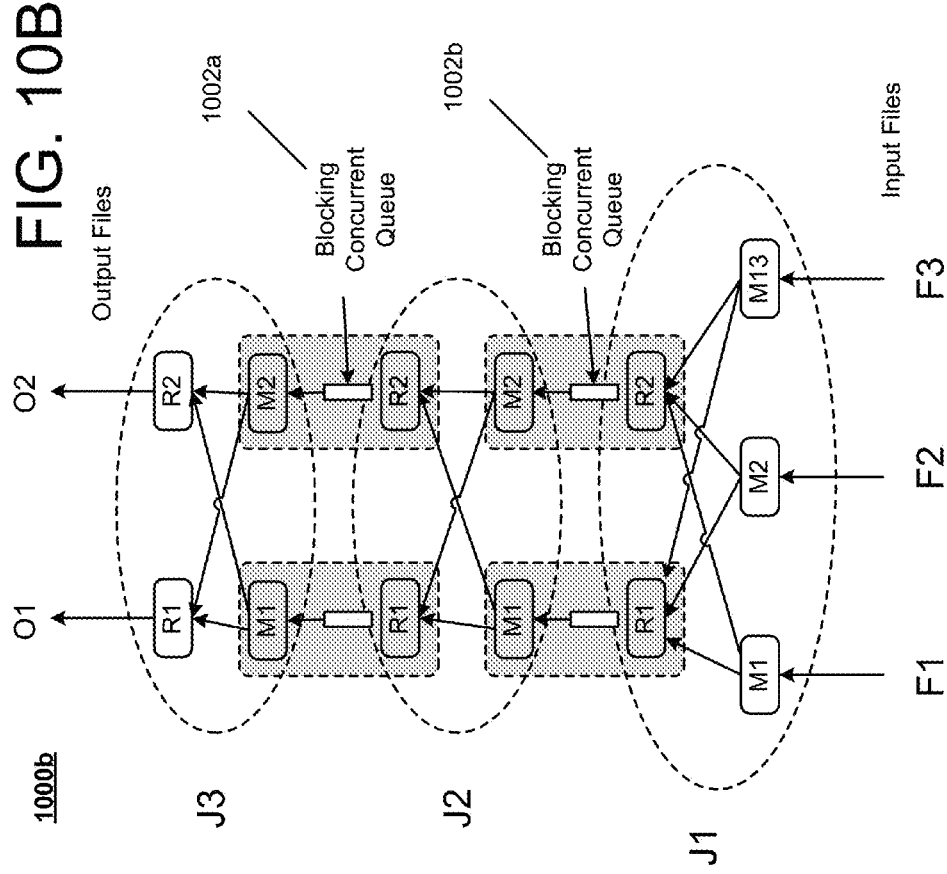
FIGS. 10A-10B illustrate an example placement of map and reduce tasks for processing a query that comprises three jobs.
Figure 10A:
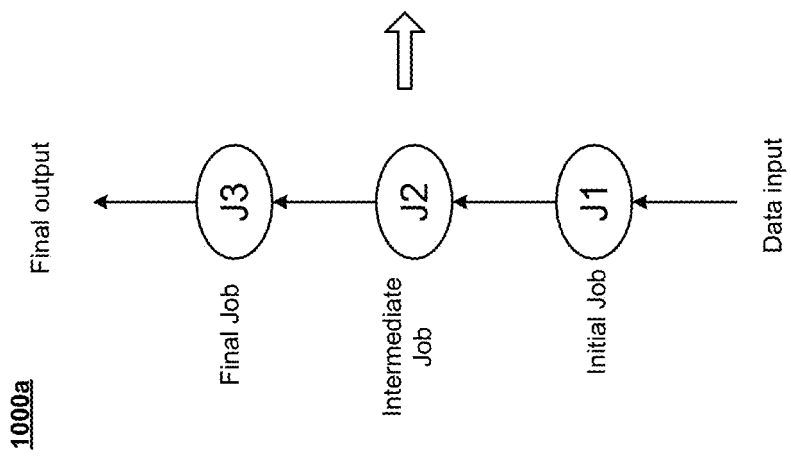

FIGS. 10A-10B illustrate an example placement of map and reduce tasks for processing a query that comprises three jobs, $J_1$, $J_2$, and $J_3$. For example, FIG. 10A illustrates the data flow 1000a between jobs and FIG. 10B illustrates the placement 1000b of map (e.g., denoted as $M_i$) and reduce (e.g., denoted as $R_i$) tasks as per the framework's scheduling algorithm (see, e.g., Algorithm 2 above). The shaded portions in the figure indicate that the corresponding map and reduce tasks have been co-scheduled on the same slave machine. The scheduler also verifies that the number of dependent map tasks are equal to the number of feeder reduce tasks of a preceding job, thus ensuring that there is one dependent map task for each feeder reduce task that is co-scheduled on the same slave machine.

For example, data flow between jobs may be modeled on the producer-consumer paradigm using a BCQ 1002 and may occur completely in memory avoiding data materialization and shuffling overheads. Further, co-location of the reducers and mappers of dependent jobs may eliminate the overhead of data serialization, de-serialization and expensive network I/O between stages in a Cloud setting.

The example framework 702 discussed herein may provide explicit end-to-end flow control along all data flow paths in the framework to avoid buffer overflows at any intermediate stage and swamping of slower receivers by faster senders due to resource/load imbalance. For example, a blocking concurrent queue (BCQ) may be used for implementing flow control. For example, the BCQ may include a lockfree data structure that supports concurrent enqueue and dequeue operations (with one reader and one writer) and may be characterized by a budget, a max and a min value.

In this context, the term budget may control the maximum capacity of the queue and may be dependent on the available memory at the reducer; the max value may control the maximum number of progress-batches the queue can hold beyond which all enqueue operations would block; and the min parameter may act like a threshold value which controls the number of progress-batches in the queue at which point the queue may be unblocked for further enqueue operations. For example, a carefully set min value on one hand may avoid frequent blocking and unblocking of the queue, while on the other, may prevent the queue being blocked for a long time. The value of the max and min parameters may be computed based on budget and the size of each progress batch. For example, if budget is set to 10 MB and the size of a progress-batch is 1 MB (on average), then max may be set to 10. If min were to be set at 7, it may provide a residual capacity of 3, i.e., the queue may be blocked if it reached the max value, until it reached a size of 7.

The flow control mechanism in the example framework 702 may manifest itself at three points in the framework: the mapper output, the download manager, and the reduce output for multi-stage MR. Each of these locations may use BCQs to implement flow control, and may seamlessly integrate to form an end-to-end flow control mechanism for the example framework.

Upadhyaya et al., "A latency and fault-tolerance optimizer for online parallel query plans," *In Proceedings of the* 2011 *ACM SIGMOD International Conference on Management of Data* (SIGMOD '11), June 2011, pp. 241-252, have recently shown how a multi-stage pipelined map-reduce system may support hybrid strategies of replay and checkpointing; these solutions may be applicable in the example framework herein.

For example, the failure semantics for the example framework may include map task failure and reduce task failure, as outlined below.

For example, any map task in progress or completed on a failed worker node may need to be rescheduled as in conventional MR.

For example, after a reduce task fails, its input may be replayed starting from the last checkpoint (e.g., map output may be materialized on local storage to allow replay). For example, explicit progress points may make it easier to determine where to take checkpoints or replay data from after a failure. For example, the framework discussed herein may further reduce the cost of replay after a failure, as processing at progress point p may depend only on input tuples that are "alive" at p, i.e., whose PIs stab p. For example, this may be leveraged in two ways, as discussed below.

For example, tuples may be filtered out with P≤p during replay to substantially reduce the amount of data replayed, and the intermediate map output saved on local storage may be pruned. For example, this optimization may not apply to external input which has P set to ∞, but may apply to intermediate results in multi-stage jobs During replay, $P^+$ may be set as $P^+$=max (p, $P^+$) for replayed tuples so that the reducer may not re-generate early results for progress points earlier than p.

As discussed in A. Rowstron et al., "Nobody ever got fired for using Hadoop on a cluster," *In 1st International Workshop on Hot Topics in Cloud Data Processing* (HotCDP 2012), Apr. 10-13, 2012, at least two production clusters (at MICROSOFT and YAHOO!) have median job input sizes under 14 GB, and 90% of jobs on a FACEBOOK cluster have input sizes under 100 GB. Based on this finding, and coupled with the expectation that progressive queries may typically be ended early, the example framework discussed herein may support a no-HA (High Availability) mode, where intermediate map output is not materialized on local storage and no checkpointing is done. This involves a failure to cascade back to the source data (e.g., the job may be restarted).

A potential consequence of progress-sync merge is that if a previous task makes slow progress, overall progress may need to be slowed to ensure global progress-sync order. While progress-sync order may be needed to derive the benefits of the example framework, there may be fixes beyond resorting to heuristics that may sacrifice semantics and determinism.

For example, a scenario may exist that involves n nodes with 1 straggler. If the processing skew is a result of imbalanced load, partitions may be dynamically moved from the straggler to a new node (reducer state may also be moved). For example, the straggler may instead be failed altogether and its computation may be restarted by partitioning its load equally across the remaining n−1 nodes. The catch-up work may be accomplished n−1 times faster, resulting in a quicker restoration of balance. For example, if failures occur halfway through a job on average, jobs may run for 2.5/(n−1) times as long due to a straggler with this scheme.

For example, support may be added for compensating reducers, which may continue to process new progress points, but may maintain enough information to revise or compensate their state once late data is received. Several engines have discussed support for compensations (see, e.g., R. Barga et al., supra; E. Ryvkina et al., "Revision processing in a stream processing engine: A high-level design," *In Proceedings of the 22nd International Conference on Data Engineering* (ICDE '06), 2006). For example, with compensating reducers, the progress-aware merge has a timeout, after which it may continue progress-ordered merge across the other inputs The example framework discussed herein may read input data, for example, from AZURE blobs and may process data in progress-sync order, at the granularity of progressive samples or progress-batches. For example, the framework may not write results between stages back to blobs due to performance (e.g., slow blob writes and reads) and cost (e.g., data volume based pricing) in a Cloud setting. As in any progressive engine, the example framework may expect users to make data available in the progress order that is appropriate for their query and accuracy needs. For example, users may materialize different orderings for different types of queries, with the associated loading cost amortized by reuse of the ordering for many ad-hoc queries.

For example, the framework may use PIs in the data to batch tuples into progress-batches. As used herein, a "progress-batch" is the granularity of data movement in the example framework; this allows users to amortize the overhead of pipelined data transfer over reducer processing cost. For example, the fact that users may typically demand progress only at non-trivial intervals (e.g., progress updates less than tens of seconds apart may be unusual) may be leveraged, and controlled data-dependent batching may be used to improve performance substantially as compared to real-time processing systems, while providing earlier feedback than fully offline systems such as MR.

One skilled in the art of data processing will appreciate that many different techniques may be used for progressive data analytics, without departing from the spirit of the discussion herein.

III. Flowchart Description

Features discussed herein are provided as example embodiments that may be implemented in many different ways that may be understood by one of skill in the art of data processing, without departing from the spirit of the discussion herein. Such features are to be construed only as example embodiment features, and are not intended to be construed as limiting to only those detailed descriptions.

Figure 11A:
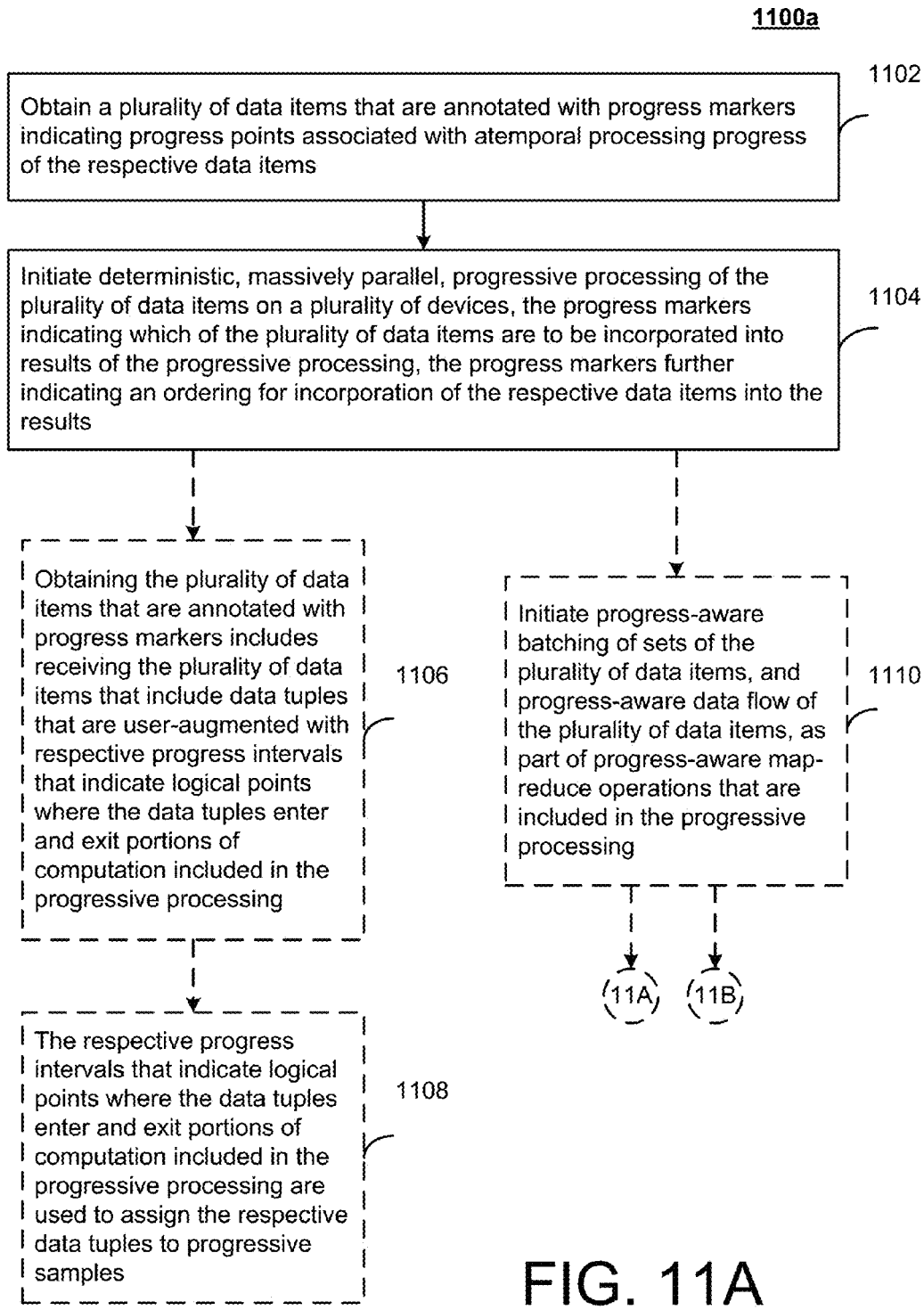
Figure 11B:
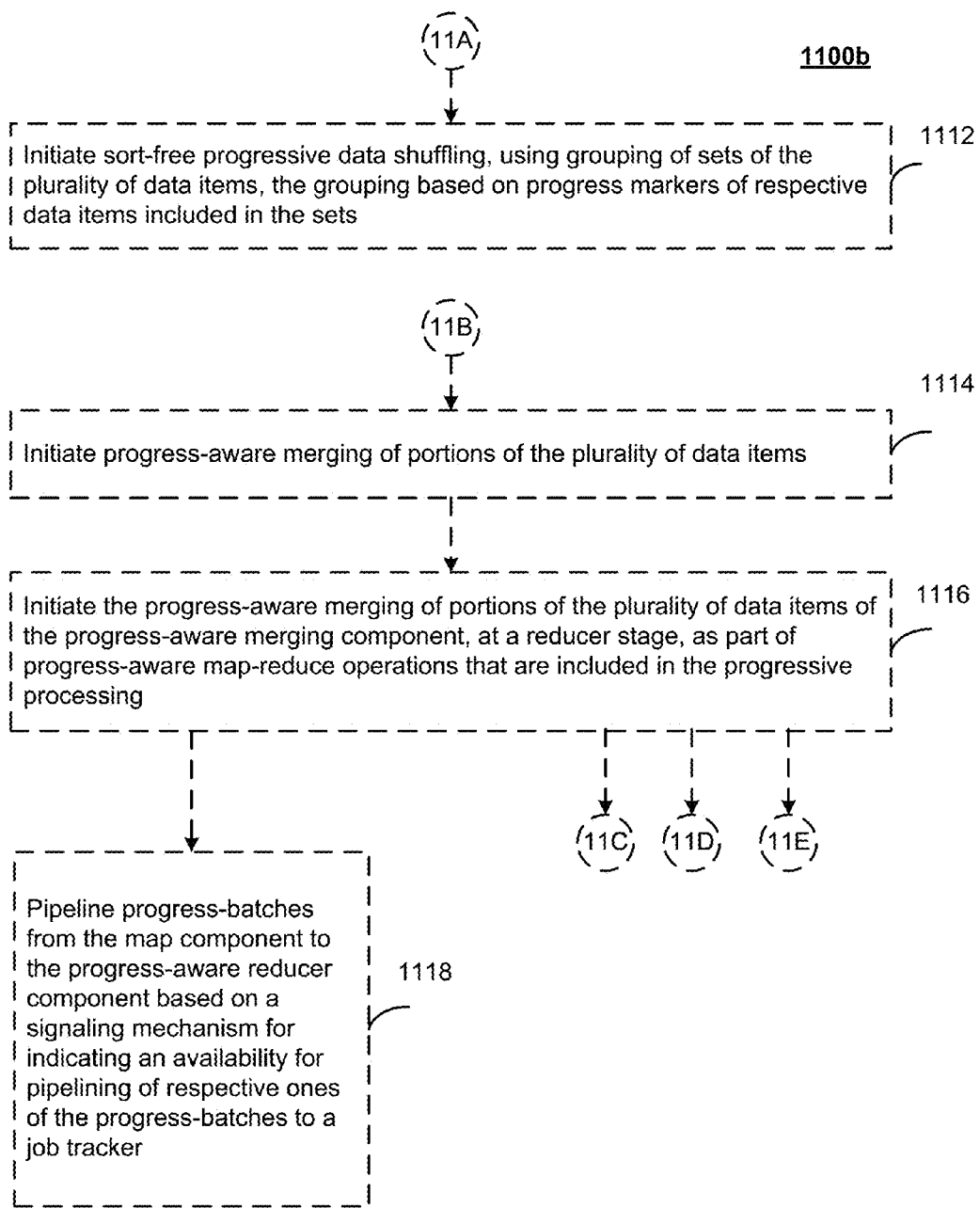

FIGS. 11A-11C are a flowchart illustrating example operations of the system of FIG. 4, according to example embodiments. In the example 1100a of FIG. 11A, a plurality of data items that are annotated with progress markers may be obtained (1102). The progress markers may indicate progress points associated with atemporal processing progress of the respective data items. For example, the data item acquisition component 408 may be configured to obtain a plurality of data items 410a, 410b, . . . , 410n that are annotated with progress markers 412a, 412b, . . . , 412n indicating progress points associated with atemporal processing progress of the respective data items 410a, 410b, . . . , 410n, as discussed above.

Deterministic, massively parallel, progressive processing of the plurality of data items may be initiated on a plurality of devices, the progress markers indicating which of the plurality of data items are to be incorporated into results of the progressive processing, the progress markers further indicating an ordering for incorporation of the respective data items into the results (1104). For example, the progressive distributed processing manager 440 may be configured to initiate deterministic, massively parallel, progressive processing of the plurality of data items 410a, 410b, . . . , 410n on a plurality of devices, the progress markers 412a, 412b, . . . , 412n indicating which of the plurality of data items 410a, 410b, . . . , 410n are to be incorporated into results 442 of the progressive processing, the progress markers 412a, 412b, . . . , 412n further indicating an ordering for incorporation of the respective data items 410a, 410b, . . . , 410n into the results 442, as discussed above.

For example, obtaining the plurality of data items that are annotated with progress markers may include receiving the plurality of data items that include data tuples that are user-augmented with respective progress intervals that indicate logical points where the data tuples enter and exit portions of computation included in the progressive processing (1106).

For example, the respective progress intervals that indicate logical points where the data tuples enter and exit portions of computation included in the progressive processing may be used to assign the respective data tuples to progressive samples (1108).

For example, progress-aware batching of sets of the plurality of data items, and progress-aware data flow of the plurality of data items may be initiated, as part of progress-aware map-reduce operations that are included in the progressive processing (1110). For example, the map component 444 may be configured to initiate progress-aware batching of sets of the plurality of data items 410a, 410b, . . . , 410n, and progress-aware data flow of the plurality of data items 410a, 410b, . . . , 410n, as part of progress-aware map-reduce operations that are included in the progressive processing, as discussed above.

For example, sort-free progressive data shuffling may be initiated, using grouping of sets of the plurality of data items, the grouping based on progress markers of respective data items included in the sets (1112), in the example 1100b of FIG. 11B. For example, the progressive data shuffle component 446 may be configured to initiate sort-free progressive data shuffling, using grouping of sets of the plurality of data items 410a, 410b, . . . , 410n, the grouping based on progress markers 412a, 412b, . . . , 412n of respective data items 410a, 410b, . . . , 410n included in the sets, as discussed above.

For example, progress-aware merging of portions of the plurality of data items may be initiated (1114). For example, the progress-aware merging component 448 may be configured to initiate progress-aware merging of portions of the plurality of data items 410a, 410b, . . . , 410n, as discussed above.

For example, the progress-aware merging of portions of the plurality of data items of the progress-aware merging component may be initiated, at a reducer stage, as part of progress-aware map-reduce operations that are included in the progressive processing (1116). For example, the progress-aware reducer component 450 may be configured to initiate the progress-aware merging of portions of the plurality of data items 410a, 410b, . . . , 410n of the progress-aware merging component 448, at a reducer stage, as part of progress-aware map-reduce operations that are included in the progressive processing, as discussed above.

For example, progress-batches may be pipelined from the map component to the progress-aware reducer component based on a signaling mechanism for indicating an availability for pipelining of respective ones of the progress-batches to a job tracker (1118). For example, the map component 444 may be configured to pipeline progress-batches from the map component 444 to the progress-aware reducer component 450 based on a signaling mechanism for indicating an availability for pipelining of respective ones of the progress-batches to a job tracker, as discussed above.

For example, lock-free in-memory concurrent enqueue and dequeue operations may be performed (1120), in the example 1100c of FIG. 11C. For example, the progress-aware reducer component may include a blocking concurrent queue (BCQ) configured to perform lock-free in-memory concurrent enqueue and dequeue operations, as discussed above.

For example, the progress-aware reducer component may be implemented by a user (1122).

For example, the reducer stage may include a streaming temporal engine that processes the progress markers substantially equivalently as processing of temporal fields (1124).

One skilled in the art of data processing will understand that there may be many ways of performing progressive data analytics, without departing from the spirit of the discussion herein.

Example techniques discussed herein may be used for any type of input that may be evaluated based on progressive data analytics. For example, progressive queries may be analyzed using example techniques discussed herein.

Customer privacy and confidentiality have been ongoing considerations in data processing environments for many years. Thus, example techniques for progressive data analytics may use user input and/or data provided by users who have provided permission via one or more subscription agreements (e.g., "Terms of Service" (TOS) agreements) with associated applications or services associated with such analytics. For example, users may provide consent to have their input/data transmitted and stored on devices, though it may be explicitly indicated (e.g., via a user accepted agreement) that each party may control how transmission and/or storage occurs, and what level or duration of storage may be maintained, if any.

Implementations of the various techniques described herein may be implemented in digital electronic circuitry, or in computer hardware, firmware, software, or in combinations of them (e.g., an apparatus configured to execute instructions to perform various functionality).

Implementations may be implemented as a computer program embodied in a pure signal such as a pure propagated signal. Such implementations may be referred to herein as implemented via a "computer-readable transmission medium."

Alternatively, implementations may be implemented as a computer program embodied in a machine usable or machine readable storage device (e.g., a magnetic or digital medium such as a Universal Serial Bus (USB) storage device, a tape, hard disk drive, compact disk, digital video disk (DVD), etc.), for execution by, or to control the operation of, data processing apparatus, e.g., a programmable processor, a computer, or multiple computers. Such implementations may be referred to herein as implemented via a "computer-readable storage medium" or a "computer-readable storage device" and are thus different from implementations that are purely signals such as pure propagated signals.

A computer program, such as the computer program(s) described above, can be written in any form of programming language, including compiled, interpreted, or machine languages, and can be deployed in any form, including as a stand-alone program or as a module, component, subroutine, or other unit suitable for use in a computing environment. The computer program may be tangibly embodied as executable code (e.g., executable instructions) on a machine usable or machine readable storage device (e.g., a computer-readable medium). A computer program that might implement the techniques discussed above may be deployed to be executed on one computer or on multiple computers at one site or distributed across multiple sites and interconnected by a communication network.

Method steps may be performed by one or more programmable processors executing a computer program to perform functions by operating on input data and generating output. The one or more programmable processors may execute instructions in parallel, and/or may be arranged in a distributed configuration for distributed processing. Example functionality discussed herein may also be performed by, and an apparatus may be implemented, at least in part, as one or more hardware logic components. For example, and without limitation, illustrative types of hardware logic components that may be used may include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Processors suitable for the execution of a computer program include, by way of example, both general and special purpose microprocessors, and any one or more processors of any kind of digital computer. Generally, a processor will receive instructions and data from a read only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto optical disks, or optical disks. Information carriers suitable for embodying computer program instructions and data include all forms of nonvolatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT), liquid crystal display (LCD), or plasma monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback. For example, output may be provided via any form of sensory output, including (but not limited to) visual output (e.g., visual gestures, video output), audio output (e.g., voice, device sounds), tactile output (e.g., touch, device movement), temperature, odor, etc.

Further, input from the user can be received in any form, including acoustic, speech, or tactile input. For example, input may be received from the user via any form of sensory input, including (but not limited to) visual input (e.g., gestures, video input), audio input (e.g., voice, device sounds), tactile input (e.g., touch, device movement), temperature, odor, etc.

Further, a natural user interface (NUI) may be used to interface with a user. In this context, a "NUI" may refer to any interface technology that enables a user to interact with a device in a "natural" manner, free from artificial constraints imposed by input devices such as mice, keyboards, remote controls, and the like.

Examples of NUI techniques may include those relying on speech recognition, touch and stylus recognition, gesture recognition both on a screen and adjacent to the screen, air gestures, head and eye tracking, voice and speech, vision, touch, gestures, and machine intelligence. Example NUI technologies may include, but are not limited to, touch sensitive displays, voice and speech recognition, intention and goal understanding, motion gesture detection using depth cameras (e.g., stereoscopic camera systems, infrared camera systems, RGB (red, green, blue) camera systems and combinations of these), motion gesture detection using accelerometers/gyroscopes, facial recognition, 3D displays, head, eye, and gaze tracking, immersive augmented reality and virtual reality systems, all of which may provide a more natural interface, and technologies for sensing brain activity using electric field sensing electrodes (e.g., electroencephalography (EEG) and related techniques).

Implementations may be implemented in a computing system that includes a back end component, e.g., as a data server, or that includes a middleware component, e.g., an application server, or that includes a front end component, e.g., a client computer having a graphical user interface or a Web browser through which a user can interact with an implementation, or any combination of such back end, middleware, or front end components. Components may be interconnected by any form or medium of digital data communication, e.g., a communication network. Examples of communication networks include a local area network (LAN) and a wide area network (WAN), e.g., the Internet.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A system comprising:
a device that includes at least one processor, and a computer readable storage medium storing instructions for execution by the at least one processor, for implementing a distributed progressive analytics engine that comprises:
a data item acquisition component that obtains a plurality of data items, the respective data items comprising respective data tuples that are each respectively annotated with progress markers indicating progress points associated with atemporal processing progress of the respective data tuples, each respective progress marker including a respective progress interval associated with each respective one of the plurality of data tuples; and
a progressive distributed processing manager that initiates deterministic, massively parallel, progressive processing of the plurality of data items on a plurality of devices, the progress markers indicating which of the plurality of data tuples are to be incorporated into results of the progressive processing, the progress markers further indicating an ordering for incorporation of the respective data tuples into the results, each respective progress interval comprising a respective progress-start attribute value indicating a first logical point where the respective data tuple enters a portion of computation included in the progressive processing, and a respective progress-end attribute value indicating a second logical point where the respective data tuple exits the portion of computation.

2. The system of claim 1, further comprising:
a map component that initiates progress-aware batching of sets of the plurality of data items, and progress-aware data flow of the plurality of data items, as part of progress-aware map-reduce operations that are included in the progressive processing.

3. The system of claim 2, further comprising:
a progressive data shuffle component that initiates sort-free progressive data shuffling, using grouping of sets of the plurality of data items, the grouping based on the progress markers of respective data items included in the sets.

4. The system of claim 2, further comprising:
a progress-aware merging component that initiates progress-aware merging of portions of the plurality of data items.

5. The system of claim 4, further comprising:
a progress-aware reducer component that initiates the progress-aware merging of portions of the plurality of data items of the progress-aware merging component, at a reducer stage, as part of progress-aware map-reduce operations that are included in the progressive processing.

6. The system of claim 5, wherein:
the map component pipelines progress-batches from the map component to the progress-aware reducer component based on a signaling mechanism for indicating an availability for pipelining of respective ones of the progress-batches to a job tracker.

7. The system of claim 5, wherein:
the progress-aware reducer component includes a blocking concurrent queue (BCQ) that performs lock-free in-memory concurrent enqueue and dequeue operations.

8. The system of claim 5, wherein:
the progress-aware reducer component is implemented by a user.

9. The system of claim 5, wherein:
the reducer stage includes a streaming temporal engine that processes the progress markers substantially equivalently as processing of temporal fields.

10. The system of claim 1, wherein:
obtaining the plurality of data items includes receiving the plurality of respective data tuples that are user-augmented with the respective progress intervals.

11. The system of claim 10, wherein:
the respective progress intervals are used to assign the respective data tuples to progressive samples.

12. The system of claim 1, wherein:
the progressive distributed processing manager initiates the deterministic, massively parallel, progressive processing that includes concurrent scheduling of multi-stage map and reduce jobs with a scheduling policy and flow control scheme.

13. A computer-readable storage medium storing executable instructions that, when executed, cause one or more processors to:
obtain a plurality of data items, the respective data items comprising respective data tuples that are each annotated with progress markers indicating progress points associated with atemporal processing progress of the respective data tuples, each respective progress marker including a respective progress interval associated with each respective one of the plurality of data tuples; and
initiate deterministic, massively parallel, progressive processing of the plurality of data items on a plurality of devices, the progress markers indicating which of the plurality of data tuples are to be incorporated into results of the progressive processing, the progress markers further indicating an ordering for incorporation of the respective data tuples into the results, each respective progress interval comprising a respective progress-start attribute value indicating a first logical point where the respective data tuple enters a portion of computation included in the progressive processing, and a respective progress-end attribute value indicating a second logical point where the respective data tuple exits the portion of computation.

14. The computer-readable storage medium of claim 13, wherein:
initiating the deterministic, massively parallel, progressive processing includes initiating distributed progressive processing of the plurality of data items using progress-aware batching of sets of the plurality of data items, and progress-aware data flow of the plurality of data items.

15. The computer-readable storage medium of claim 14, wherein:
the progress-aware batching of sets of the plurality of data items includes progress-aware batching of the sets of the plurality of data items at a map stage of the distributed progressive processing, as part of progress-aware map-reduce operations that are included in the progressive processing.

16. The computer-readable storage medium of claim 13, wherein:
initiating the deterministic, massively parallel, progressive processing includes initiating distributed progressive processing of the plurality of data items using sort-free progressive data shuffling, using grouping of sets of the plurality of data items, the grouping based on the progress markers of respective data items included in the sets.

17. The computer-readable storage medium of claim 13, wherein:
initiating the deterministic, massively parallel, progressive processing includes initiating distributed progressive processing of the plurality of data items using progress-aware merging of portions of the plurality of data items, wherein
the progress-aware merging of portions of the plurality of data items includes progress-aware merging of the portions of the plurality of data items at a reducer stage of the distributed progressive processing, as part of progress-aware map-reduce operations that are included in the progressive processing.

18. The computer-readable storage medium of claim 17, wherein:
the reducer stage includes a streaming temporal engine that processes the progress markers substantially equivalently as processing of temporal fields.

19. The computer-readable storage medium of claim 13, wherein:
obtaining the plurality of data items includes receiving the plurality of respective data tuples that are user-augmented with the respective progress intervals.

20. A method comprising:
obtaining a plurality of data items, the respective data items comprising respective data tuples that each are annotated with progress markers indicating progress points associated with atemporal processing progress of the respective data tuples, each respective progress marker including a respective progress interval associated with each respective one of the plurality of data tuples; and initiating, via a device processor, deterministic, massively parallel, progressive processing of the plurality of data items on a plurality of devices, the progress markers indicating which of the plurality of data tuples are to be incorporated into results of the progressive processing, the progress markers further indicating an ordering for incorporation of the respective data tuples into the results, each respective progress interval comprising a respective progress-start attribute value indicating a first logical point where the respective data tuple enters a portion of computation included in the progressive processing, and a respective progress-end attribute value indicating a second logical point where the respective data tuple exits the portion of computation.

* * * * *